(12) United States Patent
Naitoh et al.

(10) Patent No.: US 9,189,187 B2
(45) Date of Patent: Nov. 17, 2015

(54) SERVICE PROVIDING SYSTEM AND SERVICE PROVIDING METHOD FOR PROVIDING A SERVICE TO A SERVICE USAGE DEVICE CONNECTED VIA A NETWORK

(71) Applicants: Shohichi Naitoh, Kanagawa (JP); Naritake Kondoh, Kanagawa (JP); Shohta Suzuki, Kanagawa (JP); Sachiko Takeuchi, Tokyo (JP)

(72) Inventors: Shohichi Naitoh, Kanagawa (JP); Naritake Kondoh, Kanagawa (JP); Shohta Suzuki, Kanagawa (JP); Sachiko Takeuchi, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/338,566

(22) Filed: Jul. 23, 2014

(65) Prior Publication Data
US 2015/0036167 A1 Feb. 5, 2015

(30) Foreign Application Priority Data

Jul. 30, 2013 (JP) .................. 2013-157795
Jul. 31, 2013 (JP) .................. 2013-158465

(51) Int. Cl.
*G06K 15/00* (2006.01)
*G06F 3/12* (2006.01)

(52) U.S. Cl.
CPC .............. *G06F 3/1238* (2013.01); *G06F 3/121* (2013.01)

(58) Field of Classification Search
CPC ........... H04L 29/06; G06F 17/30; G06F 3/12; G06Q 30/00
USPC ..................... 358/1.14, 1.9, 474, 482
See application file for complete search history.

(56) References Cited

U.S. PATENT DOCUMENTS

2008/0244756 A1* 10/2008 Kitada ............................ 726/28
2013/0194633 A1    8/2013 Takatsu et al.

(Continued)

FOREIGN PATENT DOCUMENTS

JP    2009-129265    6/2009
JP    2011-186654    9/2011

(Continued)

OTHER PUBLICATIONS

Kyoo Shunsaku, Printing System, Printing Instruction Apparatus, Printing Instruction Method and Printing Instruction Program, Jun. 11, 2009, JP2009-129265.*

(Continued)

*Primary Examiner* — Martin Mushambo
(74) *Attorney, Agent, or Firm* — IPUSA, PLLC

(57) ABSTRACT

A service providing system includes an information processing device and provides a service to a service usage device connected via a network. The service providing system includes a storage unit for storing management information, in which service identification information, user identification information, and service usage device identification information are associated; an authentication unit for performing authentication, by using authentication information of the user or the device acquired from the service usage device; a service specification unit for specifying the service associated with the authentication information, based on the authenticated authentication information and the management information; and an execution unit configured to execute a process according to a usage request to use the service, when the usage request specified by the service specification unit is acquired, and to execute control of output, based on contents of an output request from the service usage device instructed by the user.

16 Claims, 23 Drawing Sheets

(56) References Cited

U.S. PATENT DOCUMENTS

| | | |
|---|---|---|
| 2013/0198211 A1 | 8/2013 | Kohkaki et al. |
| 2013/0198806 A1 | 8/2013 | Takatsu et al. |
| 2014/0122349 A1 | 5/2014 | Takatsu et al. |
| 2014/0123239 A1 | 5/2014 | Fukuda et al. |

FOREIGN PATENT DOCUMENTS

| | | |
|---|---|---|
| JP | 2011-189591 | 9/2011 |
| JP | 2013-178748 | 9/2013 |
| JP | 2013-242848 | 12/2013 |
| JP | 2013-257859 | 12/2013 |
| JP | 2014-089678 | 5/2014 |
| JP | 2014-089680 | 5/2014 |
| JP | 2014-112354 | 6/2014 |

OTHER PUBLICATIONS

Akiyama Chiaki, Information Processor, Printing Control Method, Printing Control Program, and Recording Medium, Sep. 22, 2011, JP2011-186654 A.*

* cited by examiner

FIG.4

| LICENSE TYPE | ID | REGISTRATION CODE | REGISTRATION STATE |
|---|---|---|---|
| TENANT | 10000 | AAA | REGISTERED |
| TENANT | 10001 | AAB | REGISTERED |
| TENANT | 10002 | AAC | NOT REGISTERED |
| PRINT SERVICE | 20000 | — | REGISTERED |
| PRINT SERVICE | 20001 | — | REGISTERED |
| PRINT SERVICE | 20002 | — | NOT REGISTERED |
| DISTRIBUTION SERVICE | 30000 | — | REGISTERED |
| DISTRIBUTION SERVICE | 30001 | — | REGISTERED |
| DISTRIBUTION SERVICE | 30002 | — | NOT REGISTERED |
| ... | ... | ... | ... |

FIG.5

| TENANT ID | NAME | SERVICE ID | SERVICE TYPE | VALIDITY TERM | EXTERNAL SERVICE | EXTERNAL SERVICE | ADDRESS INFORMATION | USAGE DISTRICT INFORMATION |
|---|---|---|---|---|---|---|---|---|
| 10000 | COMPANY A | 20000 | PRINT SERVICE | 1 YEAR | ONLINE STORAGE A | ONLINE STORAGE B | A@aaa.com | JAPAN |
|  |  | 20001 | PRINT SERVICE | 1 YEAR |  |  |  |  |
|  |  | 30000 | DISTRIBUTION SERVICE | 1 YEAR |  |  |  |  |
| 10001 | COMPANY B | 30001 | DISTRIBUTION SERVICE | 1 YEAR | ONLINE STORAGE A | — | A@bbb.com | US |
| ... |  | ... | ... | ... | ... | ... | ... | ... |

FIG.6

| TENANT ID | LOGIN | | IN-HOUSE AUTHENTICATION | ONLINE STORAGE A | | | ONLINE STORAGE B | | | ADDRESS INFORMATION | ... |
|---|---|---|---|---|---|---|---|---|---|---|---|
| | USER ID | PASSWORD | USER ID | ACCOUNT | PASSWORD | ACCOUNT | PERMISSION TOKEN | SCOPE | | | |
| 10000 | YAMADA | 123 | Yamada | YYamada | 1234 | yamada | aaaaa | aa, bb | A@aaa.com | | |
| | SATOH | 456 | SatohY | Sato | 4567 | sato | bbbbb | aa | B@aaa.com | | |
| | SUZUKI | 789 | SuzukiK | SUZUKI | 7890 | Suzuki | ccccc | bb, cc | C@aaa.com | | |
| 10001 | SUZUKI | 111 | – | TSuzuki | 1111 | – | – | – | A@bbb.com | | |
| | SASAKI | 222 | – | SASAKI | 222 | – | – | – | D@bbb.com | | |
| ... | ... | ... | ... | ... | ... | ... | ... | ... | ... | | |

FIG.7

| TENANT ID | DEVICE ID | SERVICE ID | SERVICE TYPE | USAGE START DATE | USAGE END |
|---|---|---|---|---|---|
| 10000 | 1 | 20000 | PRINT SERVICE | 2012/1/1 | 2012/12/31 |
|  |  | 30000 | DISTRIBUTION SERVICE | 2012/6/1 | 2013/5/31 |
|  | 2 | 20001 | PRINT SERVICE | 2012/6/1 | 2013/5/31 |
| 10001 | 3 | 30001 | DISTRIBUTION SERVICE | 2013/1/1 | 2013/12/31 |
| ... | ... | ... | ... | ... | ... |

FIG.8

| EXTERNAL SERVICE ID | SERVICE NAME | CLIENT ID | CLIENT SECRET | PRODUCT NAME | SCOPE | PERMISSION DESTINATION URL | REDIRECT DESTINATION URL |
|---|---|---|---|---|---|---|---|
| 001 | ONLINE STORAGE A | | | | | | |
| 002 | ONLINE STORAGE B | ABCDE | XXXXX | Servece | aa | http://www.001.com/auth | http://www.XXX.com/callback |
| | | | | | bb | | |
| | | | | | cc | | |
| ... | ... | ... | ... | ... | ... | ... | ... |

| TENANT ID | NAME | SERVICE ID | SERVICE TYPE | RULE | |
|---|---|---|---|---|---|
| | | | | KEYWORD A | SETTING A |
| 10000 | COMPANY A | 20000 | PRINT SERVICE | KEYWORD B | SETTING B |
| | | 20001 | PRINT SERVICE | | |
| 1000X | COMPANY X | XXXX | PRINT SERVICE | KEYWORD X | SETTING X |
| ... | ... | ... | ... | ... | ... |

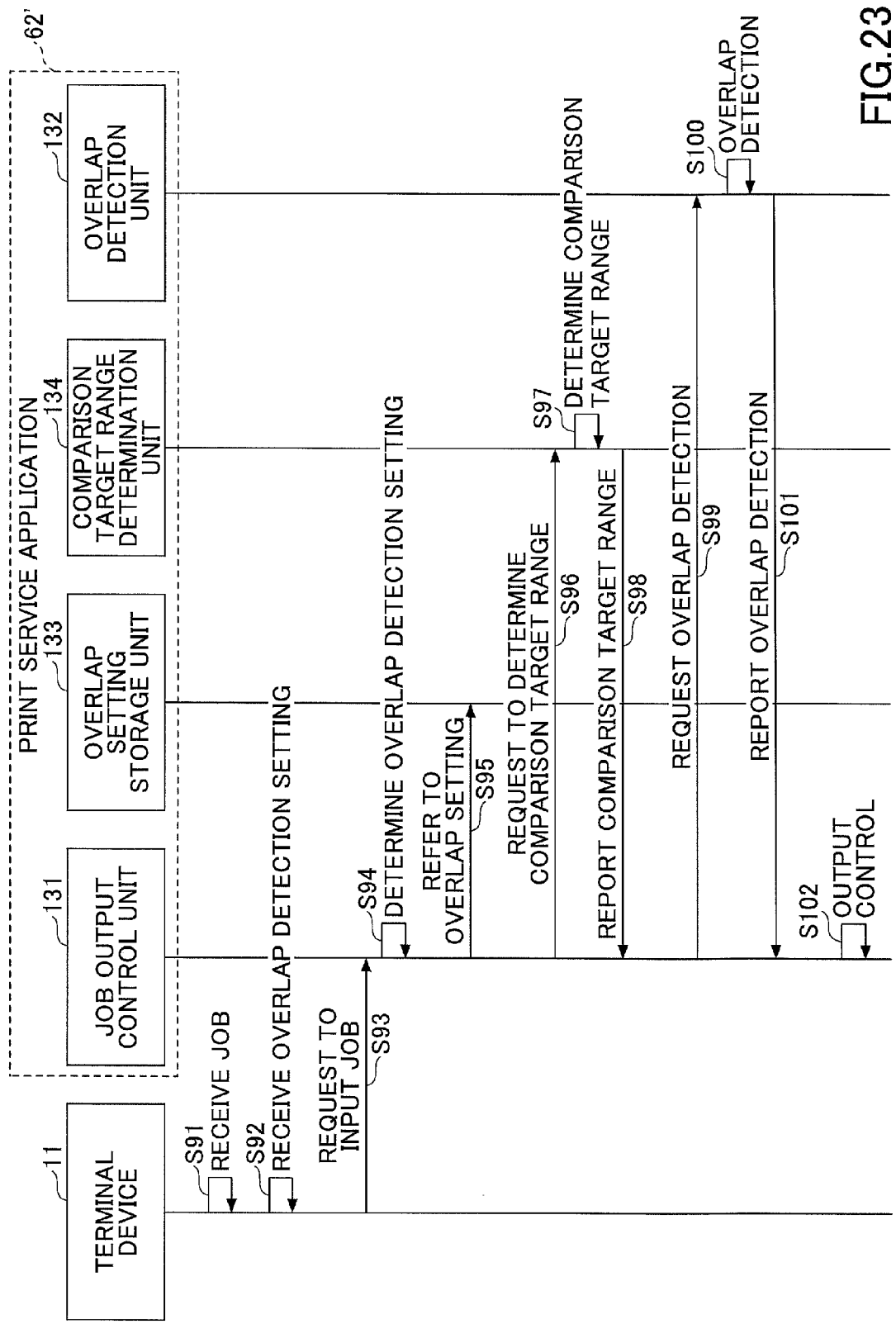

SERVICE PROVIDING SYSTEM AND SERVICE PROVIDING METHOD FOR PROVIDING A SERVICE TO A SERVICE USAGE DEVICE CONNECTED VIA A NETWORK

BACKGROUND OF THE INVENTION

1. Field of the Invention

The present invention relates to a service providing system and a service providing method.

2. Description of the Related Art

As a technology for analyzing print contents and performing print control in accordance with analysis results, there is known a method for reducing the load when sorting document data that has been printed. Specifically, the print output of each page is controlled by detecting a keyword set in advance, from character strings expressed by print control data generated as data for printing the document data (see, for example, Patent Document 1).

Furthermore, for example, there is known a method of detecting overlapping print jobs, for the purpose of preventing needless print jobs from being printed as a result of a transmission error of a print job by the user, in which the user erroneously sends an execution instruction for the same print job (see, for example, Patent Document 2).

Patent Document 1: Japanese Laid-Open Patent Publication No. 2011-186654
Patent Document 2: Japanese Laid-Open Patent Publication No. 2009-129265

SUMMARY OF THE INVENTION

The present invention provides a service providing system and a service providing method, in which one or more of the above-described disadvantages are eliminated.

According to an aspect of the present invention, there is provided a service providing system for providing a service to a service usage device connected via a network, the service providing system being constituted by at least one information processing device, the service providing system including a management information storage unit configured to store management information, in which service identification information of the service, user identification information of a user using the service, and device identification information of the service usage device are associated with each other; an authentication unit configured to execute an authentication process, by using, as authentication information, user authentication information used for user authentication, or device authentication information used for device authentication, acquired from the service usage device; a service specification unit configured to specify the service associated with the authentication information, based on the authentication information authenticated by the authentication unit and the management information; and an execution unit configured to execute a process according to a usage request to use the service, when the usage request to use the service specified by the service specification unit is acquired from the service usage device, wherein the execution unit executes control of output, based on contents of an output request from the service usage device instructed by the user.

According to an aspect of the present invention, there is provided a service providing method performed in a service providing system for providing a service to a service usage device connected via a network, the service providing system being constituted by at least one information processing device, the service providing method including storing management information, in which service identification information of the service, user identification information of a user using the service, and device identification information of the service usage device are associated with each other; executing an authentication process, by using, as authentication information, user authentication information used for user authentication, or device authentication information used for device authentication, acquired from the service usage device; specifying the service associated with the authentication information, based on the authenticated authentication information and the management information; and executing a process according to a usage request to use the service, when the usage request to use the specified service is acquired from the service usage device, wherein the executing of the authentication process includes executing control of output, based on contents of an output request from the service usage device instructed by the user.

According to an aspect of the present invention, there is provided a non-transitory computer-readable recording medium storing a program that causes a computer to execute a process performed in a service providing system for providing a service to a service usage device connected via a network, the service providing system being constituted by at least one information processing device, the process including storing management information, in which service identification information of the service, user identification information of a user using the service, and device identification information of the service usage device are associated with each other; executing an authentication process, by using, as authentication information, user authentication information used for user authentication, or device authentication information used for device authentication, acquired from the service usage device; specifying the service associated with the authentication information, based on the authenticated authentication information and the management information; and executing a process according to a usage request to use the service, when the usage request to use the specified service is acquired from the service usage device, wherein the executing of the authentication process includes executing control of output, based on contents of an output request from the service usage device instructed by the user.

BRIEF DESCRIPTION OF THE DRAWINGS

Other objects, features and advantages of the present invention will become more apparent from the following detailed description when read in conjunction with the accompanying drawings, in which:

FIG. 4 is a configuration diagram of an example of license information;

FIG. 5 illustrates a configuration diagram of an example of tenant information;

FIG. 6 illustrates a configuration diagram of an example of user information;

FIG. 7 illustrates a configuration diagram of an example of device information;

FIG. 8 illustrates a configuration diagram of an example of external service information;

FIG. 10 is an image diagram of an example of a terms of use screen;

FIG. 18 illustrates an example of rule information set in association with tenant information;

FIG. 23 is a sequence diagram of another example of an output control process of a job.

DETAILED DESCRIPTION OF THE PREFERRED EMBODIMENTS

Figure 1:
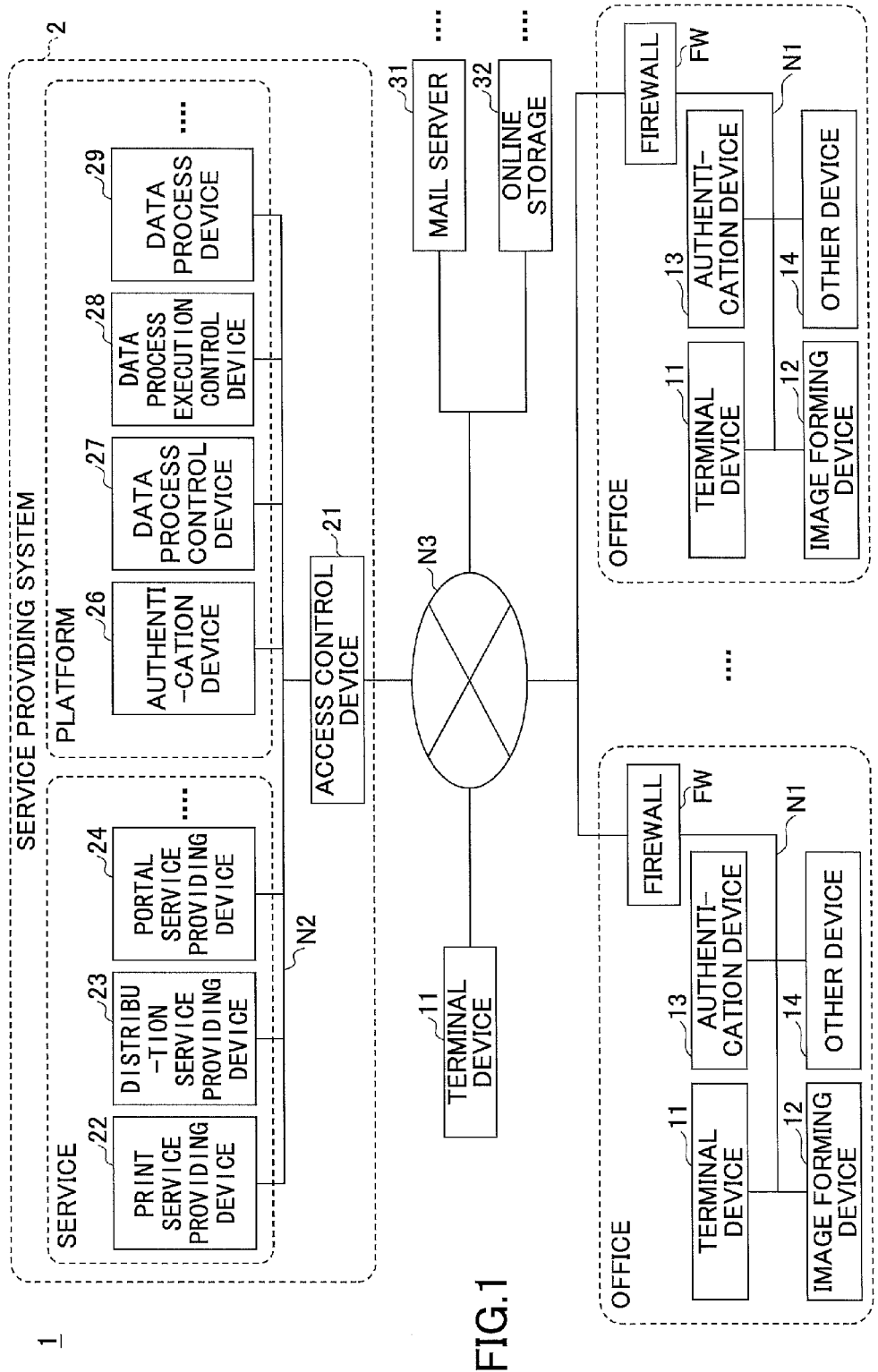
FIG. 1 is a configuration diagram of an example of an information processing system according to an embodiment.

A description is given, with reference to the accompanying drawings, of embodiments of the present invention.
System Configuration FIG. 1 is a configuration diagram of an example of an information processing system according to the present embodiment. An information processing system 1 illustrated in FIG. 1 includes a private network N1 in an office, a network N2 of a service providing system 2 represented by a cloud service, and a network N3 such as the Internet. The networks N1 through N3 are examples of a network environment.

In the network N1 in an office, a firewall FW is installed. The firewall FW restricts accesses from unauthorized access sources. In the network N2 of the service providing system 2, an access control device 21 is installed. The access control device 21 restricts accesses made via the network N3.

The network N1 in an office is a private network that is inside the firewall FW. To the network N1, a terminal device 11, an image forming device 12, an authentication device 13, and another device 14 are connected.

The terminal device 11 is realized by an information processing device (computer system) in which a typical OS (Operating System) is installed. The terminal device 11 is a device operable by the user, such as a PC (Personal Computer), a tablet PC, a notebook PC, a smartphone, and a mobile phone.

The image forming device 12 is a device having an image forming function, such as a multifunction peripheral, a copier, a scanner, and a laser printer. The authentication device 13 is realized by an information processing device in which a typical OS is installed. The authentication device 13 provides a user authentication function. The other device 14 is a device such as a projector and an electronic blackboard device.

Note that the terminal device 11, the image forming device 12, the authentication device 13, and the other device 14 include a wireless communication unit or a wired communication unit. FIG. 1 illustrates an example where there is one of each of the terminal device 11, the image forming device 12, the authentication device 13, and the other device 14; however, there may be a plurality of each of these devices.

The service providing system 2 is a system constructed by a provider, providing a cloud service via the network N3. Note that in the present embodiment, the cloud service is described as an example; however, the present embodiment is also applicable to other services provided via the network N3, such as services provided by ASP (Application Service Provider) and web services.

The network N2 of the service providing system 2 is connected to the network N3 by the access control device 21. To the network N2, the access control device 21, a print service providing device 22, a distribution service providing device 23, a portal service providing device 24, an authentication device 26, a data process control device 27, a data process execution control device 28, and a data process device 29, are connected.

Details of the print service providing device 22, the distribution service providing device 23, the portal service providing device 24, the authentication device 26, the data process control device 27, the data process execution control device 28, and the data process device 29 are described below.

The devices in the service providing system 2 such as the access control device 21 and the print service providing device 22 may be realized by one or more information processing devices. That is to say, the devices in the service providing system 2 may be realized by one information processing device, or may be distributed across a plurality of information processing devices.

Note that the devices in the service providing system 2 may be realized by being combined in a single computer. That is to say, the number of information processing devices constituting the devices in the service providing system 2 does not limit the application scope of the present invention.

Furthermore, part of or all of the devices in the service providing system 2 may be realized in a private network such as the network N1 in an office. The information processing system 1 according to the present embodiment indicates a preferred example. For example, the application scope of the present invention is not limited according to whether there is a firewall FW between the service providing system 2 and the devices of the network N1 in the office accessed for using the service providing system 2.

The service providing system 2 may be broadly divided into devices for realizing service providing functions for providing various services, and devices for realizing platform functions that are commonly usable when providing the various services.

Note that the print service providing device 22, the distribution service providing device 23, and the portal service providing device 24 are examples of devices for realizing the service providing functions for providing various services. The authentication device 26, the data process control device 27, the data process execution control device 28, and the data process device 29 are examples of devices for realizing platform functions that are commonly usable when providing the various services.

The way of broadly dividing the service providing system 2 as described above, is a conceptual perception for describing the present invention to be easily understandable; the service providing system 2 need not be constituted based on such a perception.

Furthermore, to the network N3, such as the Internet, the terminal device 11, a mail server 31, and an online storage 32, are connected. As illustrated in FIG. 1, the terminal device 11 may be connected to a network outside the network N1 in the office. In the example of the information processing system 1 illustrated in FIG. 1, the terminal device 11 is connected to the network N1 in the office and the network N3 such as the Internet.

The mail server 31 performs processes relevant to e-mails, such as sending and receiving e-mails of users. The online storage 32 performs processes relevant to a service of lending storage areas of the storage. The mail server 31 and the online storage 32 are realized by one or more information processing devices.

Hardware Configuration

Figure 2:
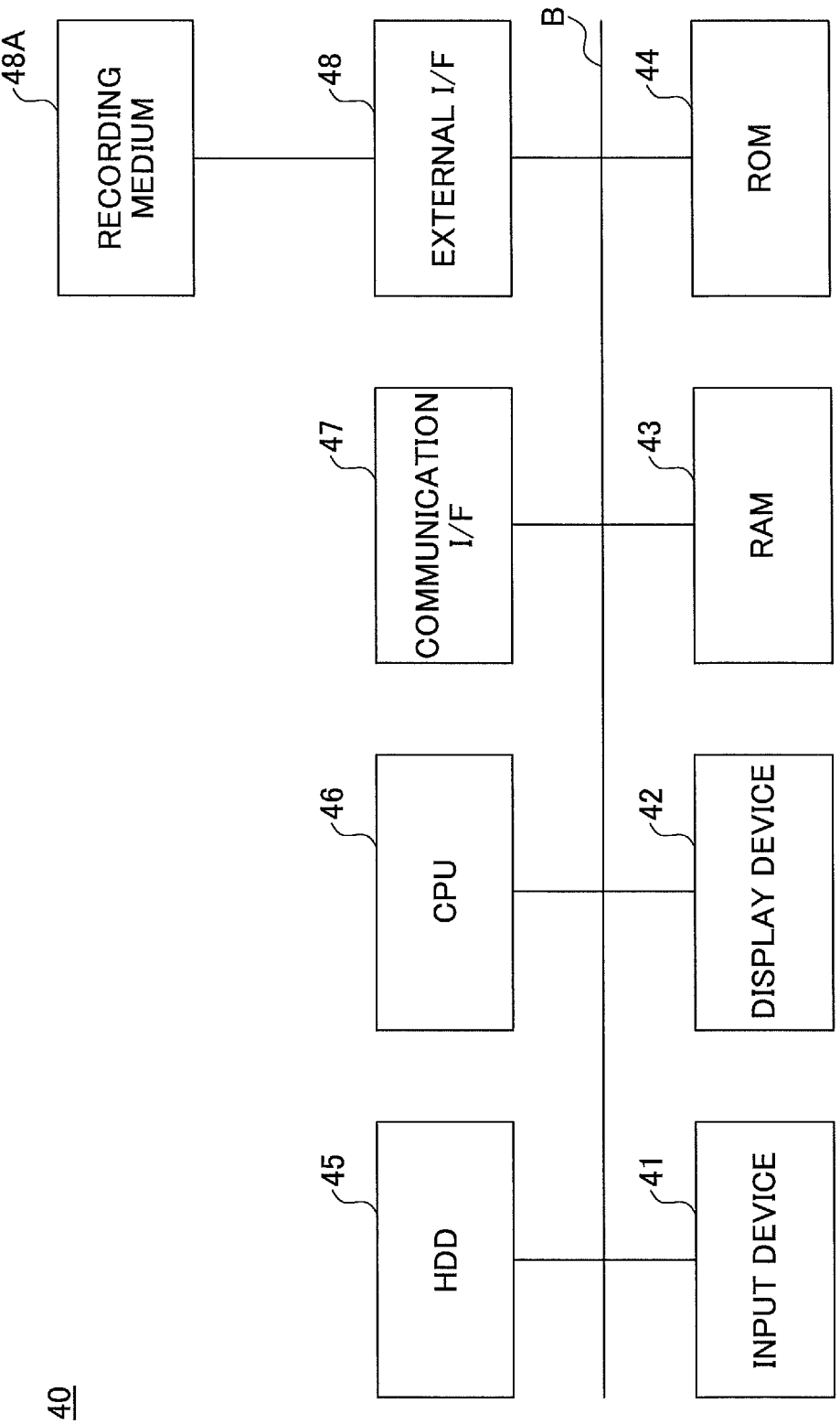
FIG. 2 illustrates a hardware configuration of an example of a computer system according to an embodiment.

The terminal device 11 and the authentication device 13 of FIG. 1 may be realized by a computer system having a hardware configuration as illustrated in, for example, FIG. 2. Similarly, the devices in the service providing system 2, such as the access control device 21 and the print service providing device 22 illustrated in FIG. 1, may be realized by a computer system having a hardware configuration as illustrated in, for example, FIG. 2.

The mail server 31 and the online storage 32 illustrated in FIG. 1 are also realized by a computer system having a hardware configuration as illustrated in FIG. 2. FIG. 2 illustrates a hardware configuration of an example of a computer system according to the present embodiment.

A computer system 40 illustrated in FIG. 2 includes an input device 41, a display device 42, a RAM 43, a ROM 44, a HDD (Hard Disk Drive) 45, a CPU (Central Processing Unit) 46, a communication I/F 47, and an external I/F 48, which are interconnected by a bus B.

The input device 41 includes a keyboard, a mouse, and a touch panel, and is used by the user for inputting various operation signals. The display device 42 includes a display, and displays processing results by the computer system 40.

The RAM 43 is a volatile semiconductor memory (storage device) for temporarily saving programs and data. The ROM 44 is a nonvolatile semiconductor memory (storage device) that can save programs and data even after the power is turned off. The ROM 44 stores programs and data such as BIOS (Basic Input/Output System) that is executed when the computer system 40 is activated, OS settings, and network settings.

The HDD 45 is a nonvolatile storage device storing programs and data. The stored programs and data include, for example, an OS that is the basic software for controlling the entire computer system 40, and application software for providing various functions on the OS.

The HDD 45 manages the stored programs and data by a predetermined file system and/or a DB (database).

The CPU 46 is a processor for controlling the entire computer system 40 and realizing functions of the computer system 40 by loading programs and data from storage devices such as the ROM 44 and the HDD 45 into the RAM 43, and executing processes.

The communication I/F 47 is an interface for connecting the computer system 40 to the networks N1 through N3. Accordingly, the computer system 40 performs data communication via the communication I/F 47.

The external I/F 48 is an interface between the computer system 40 and an external device. An example of the external I/F 48 is a recording medium 48A. Accordingly, the computer system 40 can read and/or write data with respect to the recording medium 48A via the external I/F 48.

Examples of the recording medium 48A are a flexible disk, a CD (Compact Disk), a DVD (Digital Versatile Disk), a SD memory card, and a USB memory (Universal Serial Bus memory).

By the above hardware configuration, the computer system 40 can realize various processes.

Software Configuration

Service Providing System

Figure 3:
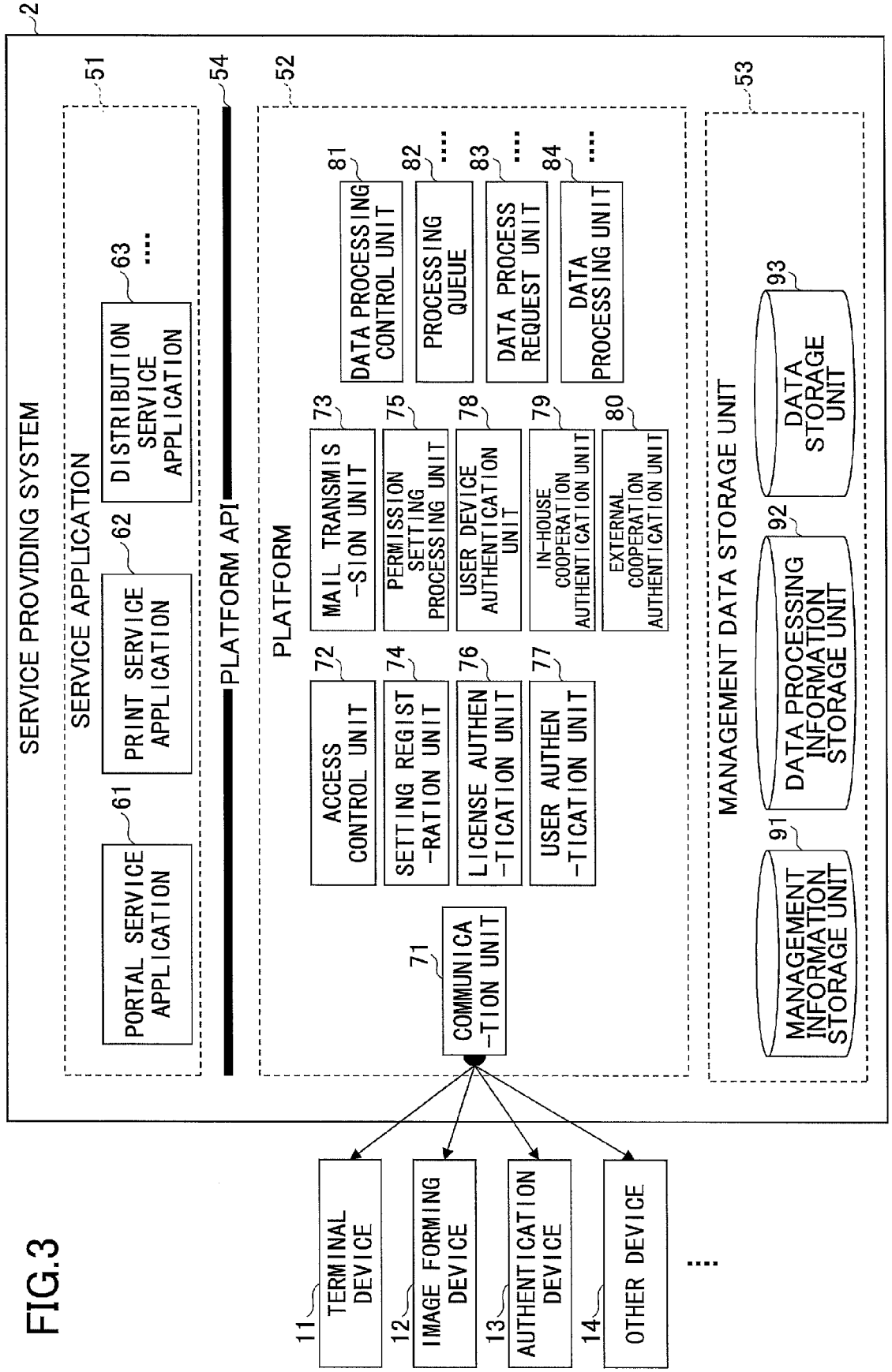
FIG. 3 is a process block diagram of an example of a service providing system according to an embodiment.

FIG. 3 is a process block diagram of an example of the service providing system 2 according to the present embodiment. The service providing system 2 of FIG. 3 realizes a service application 51, a platform 52, a management data storage unit 53, and a platform API (Application Programming Interface) 54, by executing programs.

The service applications 51 of FIG. 3 include a portal service application 61, a print service application 62, and a distribution service application 63, for example. The service application 51 is an application having a function for providing various services.

For example, the portal service application 61 is implemented in the portal service providing device 24 of FIG. 1. The print service application 62 is implemented in the print service providing device 22. The distribution service application 63 is implemented in the distribution service providing device 23.

The portal service application 61 is an application that provides a portal site for the user to use various services such as a print service and a distribution service. The portal service application 61 performs processes for the user to use various services as described below, such as a tenant registration process, a service registration process, and a registration process of various kinds of management information, in cooperation with the platform 52.

The print service application 62 is an application for providing a print service realizing printing by, for example, the image forming device 12, by storing print data and sending the print data to the image forming device 12.

The distribution service application 63 is an application for providing a distribution service of performing data processing with respect to image data sent from various devices such as the image forming device 12, and distributing the processed data to the online storage 32, illustrated in FIG. 1.

Note that the service applications 51 are not limited to the examples of FIG. 3; the service applications 51 may include an application for providing a service of sending the stored image data (projection data) to another device 14 such as a projector. Furthermore, the service applications 51 may include an application for providing a service of sending the stored image data (projection data) to another device 14 such as an electronic blackboard device. As described above, the service applications 51 include applications for providing some kind of service to the devices such as the image forming device 12 used by the user.

The platform API 54 is an interface for the service application 51 to use the platform 52. The platform API 54 is an interface that is defined in advance and provided for the platform 52 to receive requests from the service application 51; for example, the platform API 54 is constituted by functions and classes.

Note that when the service providing system 2 is constituted by being distributed across a plurality of information processing devices, for example, a Web API that can be used via the network may be used as the platform API 54.

The platform 52 includes a communication unit 71, an access control unit 72, a mail transmission unit 73, a setting registration unit 74, a permission setting processing unit 75, a license authentication unit 76, a user authentication unit 77, a user device authentication unit 78, an in-house cooperation authentication unit 79, an external cooperation authentication unit 80, a data processing control unit 81, one or more processing queues 82, one or more data process request units 83, and one or more data processing units 84.

The communication unit 71 is a functional unit for executing communication with devices such as the image forming device 12, and is implemented in the access control device 21 of FIG. 1, for example. The access control unit 72 is a functional unit for executing access control according to various accesses requested to the service providing system 2 from devices such as the image forming device 12, and is implemented in the access control device 21, for example.

The mail transmission unit 73 is a functional unit for transmitting e-mails, and is implemented in the authentication device 26 of FIG. 1, for example. The setting registration unit 74 is a functional unit for setting and registering various management data items to be stored in the management data storage unit 53, and is implemented in the authentication device 26, for example. The permission setting processing unit 75 is a functional unit for executing processes for setting permission with respect to an external service such as the online storage 32, and is implemented in the authentication device 26, for example.

The license authentication unit 76 is a functional unit for executing authentication relevant to a license, based on license information and tenant information stored in the management data storage unit 53 as described below, and is implemented in the authentication device 26, for example. The user authentication unit 77 is a functional unit for executing user authentication based on a login request from a device that does not require device authentication such as the terminal device 11, and is implemented in the authentication device 26, for example.

The user device authentication unit 78 is a functional unit for executing user authentication based on a login request from a device requiring device authentication such as the image forming device 12, and is implemented in the authentication device 26, for example.

The in-house cooperation authentication unit 79 is a functional unit for performing user authentication when the user is authenticated by the authentication device 13 illustrated in FIG. 1 at a device such as the image forming device 12, and uses a user ID acquired from the authentication device 13 to log in, and the in-house cooperation authentication unit 79 is implemented in the authentication device 26, for example. The external cooperation authentication unit 80 is a functional unit for executing an authentication process for logging into the online storage 32 of FIG. 1, and is implemented in the authentication device 26, for example.

The data processing control unit 81 is a functional unit for controlling data processing executed based on a request from the service application 51, and is implemented in the data process control device 27, for example. The one or more processing queues 82 are message queues corresponding to the type of data processing, and a message of a request relevant to data processing from the data processing control unit 81 is registered in the processing queue 82. The processing queues 82 are implemented in the data process control device 27, for example.

The one or more data process request units 83 monitors the processing queue 82 assigned to itself, and receives a message of a request relevant to data processing from the processing queue 82. The data process request unit 83 is a functional unit for requesting the data processing unit 84 to execute data processing corresponding to the received message, and is implemented in the data process execution control device 28, for example.

The one or more data processing units 84 are functional units for executing data processing in response to a request from the data process request unit 83, and are implemented in the data process device 29, for example. Note that examples of data processing executed by the data processing unit 84 include a dividing process of dividing the request from the service application 51, a data format conversion process of converting the data format, and an OCR process of executing OCR. Furthermore, an example of data processing executed by the data processing unit 84 includes an upload process of uploading data in the online storage 32.

Note that depending on the type of data processing, the data process request unit 83 and the data processing unit 84 may be implemented in the data process execution control device 28, for example.

The management data storage unit 53 includes, for example, a management information storage unit 91, a data processing information storage unit 92, and a data storage unit 93.

The management information storage unit 91 stores management information such as license information, tenant information, user information, and device information. The management information storage unit 91 is implemented in, for example, the authentication device 26. The data processing information storage unit 92 stores information relevant to the requested data processing. The data processing information storage unit 92 is implemented in the data process control device 27, for example. The data storage unit 93 stores other data such as application data and print data. The data storage unit 93 is implemented in the data process control device 27, for example.

Examples of the management data stored in the management data storage unit 53 of FIG. 3 are as follows. FIG. 4 is a configuration diagram of an example of license information. The license information includes the license type, an ID, a registration code, and a registration state, as data items. The license type is information expressing the type of license.

The license types include a tenant, a print service, and a distribution service. The ID is an ID of each license, and is information used for license authentication. The registration code is information used when registering a tenant. The registration state is information indicating whether the registration state is a state where registration (registration of ID) of a license by the user has been completed or not (registered or not registered).

FIG. 5 illustrates a configuration diagram of an example of tenant information. The tenant information includes a tenant ID, a name, a service ID, a service type, a validity term, an external service, address information, and usage district information, as data items. The tenant ID is ID when "tenant" is the license type in the license information, and is information that is registered as the user performs tenant registration.

The name is the name that the user sets when performing tenant registration, and a company name or an organization name is set, for example. The service ID is an ID of a service when the license type is "print service" and "distribution service" in the license information, and is information that is registered as the user performs service registration after tenant registration is performed.

The service type is information expressing the license type (type of service) corresponding to the service ID. The validity term is the validity term of the service ID. The validity term of a service ID registered in a particular device is managed from the time point of registration.

The external service is information expressing an external service that is used in cooperation with the service providing system 2. An example of the external service is the online storage 32 illustrated in FIG. 1, for example. The address information is a mail address of the administrator registered when performing tenant registration.

The usage district information is information relevant to the country/area in which the service is used. Note that the online storage 32 is an example of the external service. Information items such as an account, a password, a permission token, and a scope described below, are examples of information items used when using an external service.

Note that permission is to set a usage range (authority) relevant to the usage of a service, as to which service is to be used and which resource is allowed to be accessed, when the user uses a service. Permission may be set by using a standard technology such as AIP permission called OAuth. From the viewpoint of using an external service such as the online storage 32 from the service providing system 2, the external service serves as a service provider of OAuth, and the service providing system 2 serves as the consumer of OAuth.

FIG. 6 illustrates a configuration diagram of an example of user information. The user information includes a tenant ID, a user ID and a password used for login, a user ID for in-house authentication, an account for online storage, a password, a permission token and scope, and address information, as data items.

The user information is for managing information of each user in units of tenant IDs. The user ID and the password used for login are authentication information used for user authentication when logging into the service providing system 2. The user. ID for login may be the user name, or any information as long as the user can be identified when logging into the service providing system 2.

The user ID for in-house authentication is user specification information for specifying a user in the authentication device 13 of the network N1 in the office. Furthermore, the user ID for in-house authentication is authentication information used for user authentication when the user specification information acquired from the authentication device 13 is used for login. The user ID for in-house authentication may be any user specification information by which a user can be specified in the authentication device 13 of the network N1 in the office, and may be a card ID of an IC card carried by the user or a terminal ID of a mobile terminal.

The account and password for online storage are authentication information used for logging into the online storage 32. The permission token is information for using the online storage 32 within a range of a particular authority. The scope is information for specifying the usage range set by the permission.

Note that an account may be a user ID, a user name, or an address for online storage; the account may be any authentication information used for authentication when the user logs into the target online storage 32. The address information is the mail address of the user.

FIG. 7 illustrates a configuration diagram of an example of device information. The device information includes a tenant ID, a device ID, a service ID, a service type, a usage start date, and a usage end date, as data items. The device information is for managing information of each device in units of tenant IDs.

The device ID is information for identifying a device, and is information used for device authentication. An example of the device ID is the equipment number of the device. The service ID and the service type are the same information as the service ID and the service type in the tenant information, and are registered as the user registers a service ID with respect to a particular device.

The usage start date is information of the date when the service ID is registered. The usage end date is information of the date when the validity term of the registered service ID has ended. The device registered in the device information can use the service of the registered service ID, from the usage start date to the usage end date of the service ID.

Note that depending on the type of service and the type of license, there may be service IDs that have unlimited validity terms (virtually no expiration). Furthermore, even if the device does not have its device information registered, it is assumed that part of the functions provided by the service providing system 2 can be used, excluding services (functions) that cannot be used unless device authentication is performed.

Note that, in the present embodiment, the terminal device 11 is indicated as an example of a device that does require registration of device information. Furthermore, in the present embodiment, the image forming device 12 is indicated as an example of a device that requires registration of device information.

Examples of a function that can be used in the terminal device 11 include setting/registering management data, and inputting and deleting print data. Furthermore, examples of functions that can be used in the image forming device 12 include acquiring print data and sending distribution data.

Note that the provider providing the service is to determine which functions require device authentication to be used and which functions do not require device authentication to be used; and there may be services that do not require device authentication.

FIG. 8 illustrates a configuration diagram of an example of external service information. The external service information includes an external service ID, a service name, a client ID, a client secret, a product name, a scope, a permission destination URL, and a redirect destination URL, as data items. The external service ID is information for specifying an external service.

The service name is the name of an external service. The client ID is information for specifying the service providing system 2 that is issued by an external service. The client secret is secret information for ensuring the personal identification of the client ID, and is information serving as a password.

The product name is information specifying the service application 51. The scope is information specifying the usage range of the external service. The permission destination URL is URL (for example, a URL of a permission server included in the external service) of a permission system included in the external service. The redirect destination URL is a URL of the service providing system 2 that is redirected from the external service (for example, a URL of a function serving as a permission client of the permission setting processing unit 75).

As described above, the tenant ID is associated with the service provided by the service providing system 2, the user using the service, and a device using the service; the tenant ID is information for managing the user, the device, and the service in the service providing system 2. Furthermore, the tenant ID is information (usage target specification information) for specifying the usage target, such as specifying which service is to be provided to which user, and furthermore to which device, among the services that can be provided by the service providing system 2.

Details of Process

In the following, a detailed description is given of the process of the information processing system 1 according to the present embodiment.

Process from Tenant Registration to Service Registration

Figure 9:
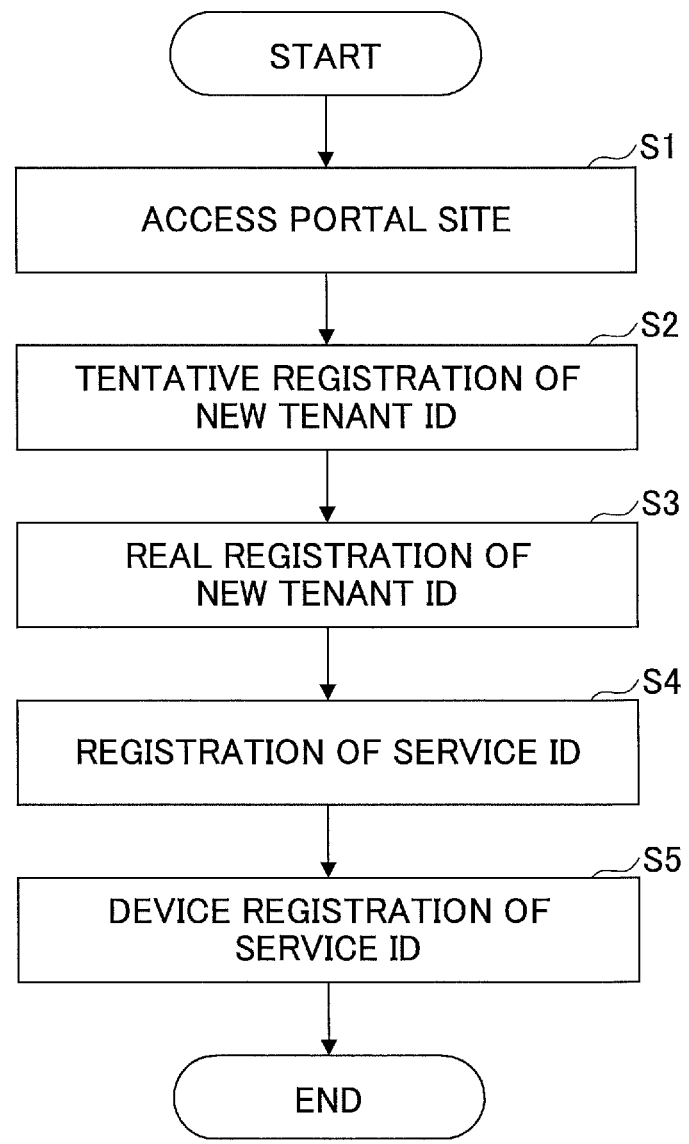
FIG. 9 is a flowchart of an example expressing processing procedures from tenant registration to service registration.

FIG. 9 is a flowchart of an example expressing processing procedures from tenant registration to service registration. First, the user, who wants to perform tenant registration (for example, the administrator of a company or an organization), acquires a tenant ID and a registration code from the service provider (for example, the person in charge of providing and selling the service) of the service providing system 2.

Note that examples of the method of acquiring a tenant ID and a registration code are a method of directly acquiring a tenant ID and a registration code from the service provider, and a method of acquiring a tenant ID and a registration code by accessing an exclusive-use site operated by the service provider from the terminal device 11.

In step S1, the user operates the input device 41 of the terminal device 11, so that the terminal device 11 accesses the portal site of the service providing system 2. The terminal device 11 accesses the portal site of the service providing system 2 based on the operation of the user.

Because the access is made to the portal site, the access control unit 72 of the service providing system 2 allows the access from the terminal device 11, and lets the terminal device 11 access the portal service application 61.

The portal service application 61 causes the display device 42 of the terminal device 11 to display the top screen. The user can operate the input device 41 of the terminal device 11 to select, from the top screen, whether to request login or whether to request new tenant registration. Here, a description is given, assuming that a request for new tenant registration is requested.

Note that if the user is registered in the user information of the management information storage unit 91 (administrator or other user), the user can select to request login by inputting a tenant ID, a user ID, and a password.

When new tenant registration is requested, in step S2, the portal service application 61 of the service providing system 2 causes the display device 42 of the terminal device 11 to display an input screen for performing tentative registration of the tenant ID. The user operates the input device 41 of the terminal device 11, inputs information for performing tentative registration of the tenant ID, and then requests tentative registration. Based on the operations of the user, the terminal device 11 makes a request for tentative registration to the portal site of the service providing system 2.

Note that examples of the information input for performing tentative registration of the tenant ID are information relevant to the country/area where the service is used (usage district information), and information indicating to agree with the terms of use displayed according to the country/area where the service is used (binding terms and conditions). The information input for performing tentative registration of the tenant ID may include information such as a tenant ID, a registration code, a mail address, and the used language.

Thus, the service providing system 2 holds the terms of use (binding terms and conditions) information according to the country/area where the service is used. The portal service application 61 of the service providing system 2 performs display control of causing the display device 42 of the terminal device 11 to display the terms of use according to the usage district information input by the user to perform tentative registration of the tenant ID, and prompts the user to select whether the user agrees with the terms of use.

Figure 10:
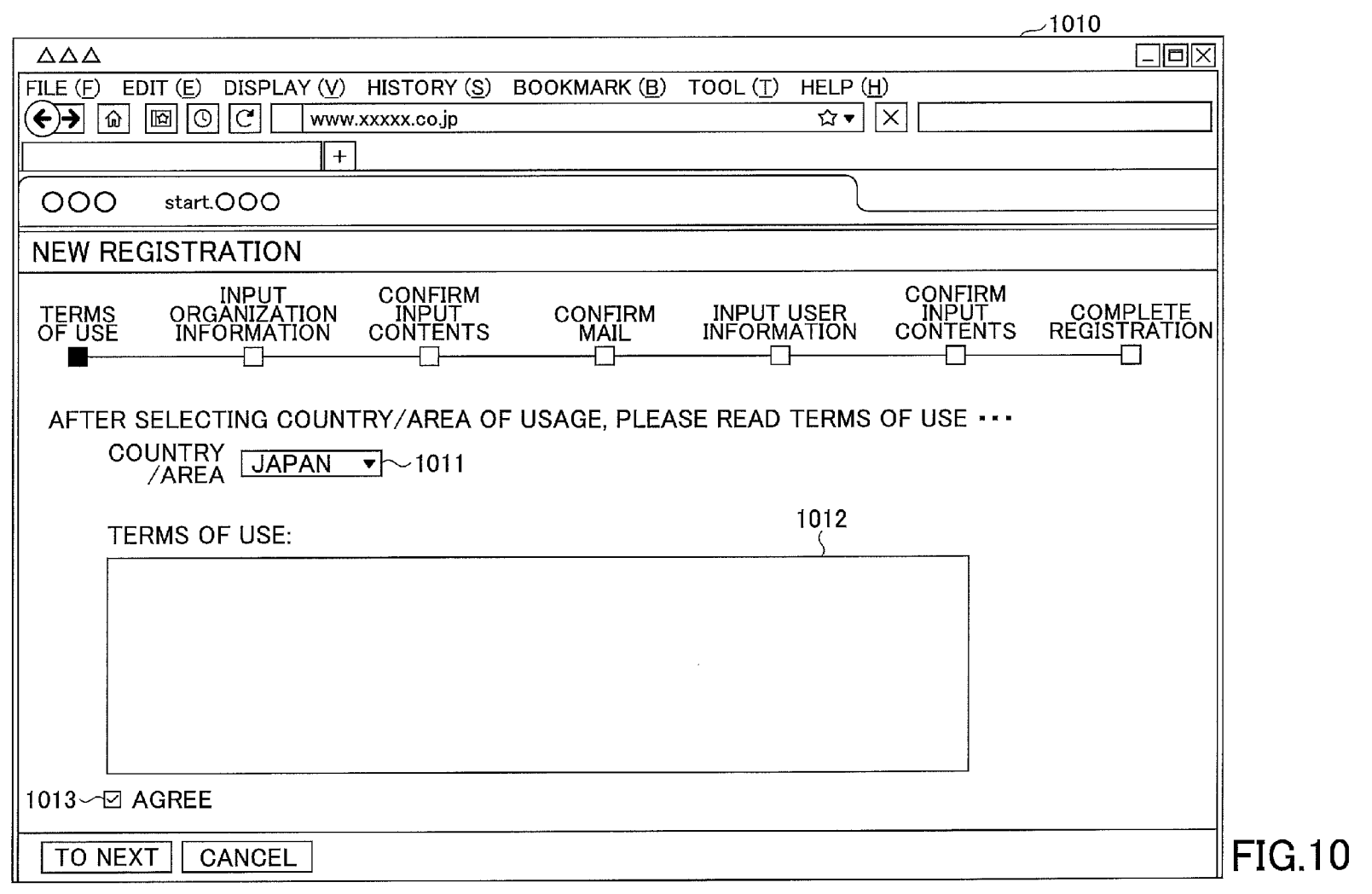

FIG. 10 is an image diagram of an example of the terms of use screen. A terms of use screen 1010 includes a selection field 1011 for prompting the user to select the country/area where the service is to be used, a terms of use field 1012 displaying the terms of use according to the selection field 1011, and a check box 1013 for prompting the user to select whether to agree with the terms of use.

When tentative registration is requested from the user's terminal device 11, the portal service application 61 requests the license authentication unit 76 to perform a process of confirming the validity of the tenant ID and the registration code included in the information input for performing tentative registration of the tenant ID. The license authentication unit 76 that has received the request executes a license authentication process, and determines (match) whether a tenant ID and a registration code for which a process of confirming the validity has been requested, is stored the license information of FIG. 4 stored by the management information storage unit 91.

When the tenant ID and registration code, for which a process of confirming the validity has been requested, is stored, the license authentication unit 76 determines whether the registration state associated with the tenant ID and registration code is "not registered".

When the registration state is "not registered", the license authentication unit 76 determines that the tenant ID and registration code, for which a process of confirming the validity has been requested, is valid information, and authenticates the tenant ID (license). The license authentication unit 76 reports the authentication result of the license to the portal service application 61.

When the tenant ID and registration code are valid information, the portal service application 61 requests the setting registration unit 74 to register the tenant ID, the mail address, and the usage district information included in the information input for performing tentative registration of the tenant ID. The setting registration unit 74 registers the tenant ID, the mail address, and the usage district information in the tenant information in the management information storage unit 91, according to the request from the portal service application 61.

When registration by the setting registration unit 74 is performed, in step S3, the portal service application 61 generates a URL for the real registration that is the access destination for displaying the screen for the real registration, and creates a mail describing the URL for the real registration. The portal service application 61 requests the mail transmission unit 73 to send the created mail.

The mail transmission unit 73 sends the mail addressed to the mail address included in the information that has been input for performing the tentative registration of the tenant ID. When the mail is sent by the mail transmission unit 73, the portal service application 61 causes the display device 42 of the terminal device 11 to display a report screen reporting that the mail has been sent.

Note that the URL for the real registration is managed by a validity term (for example, one hour) from when the URL is generated. Furthermore, in the mail sent from the mail transmission unit 73, from the viewpoint of enhancing security, it is assumed that at least one of the information items of the tenant ID and the registration code is not described.

Next, the user operates the input device 41 of the terminal device 11 to access the URL for the real registration described in the received mail. The terminal device 11 accesses the URL for the real registration based on the operation by the user.

Note that the terminal device 11 accessing the URL for the real registration may not be the same as the terminal device 11 that has made the request for tentative registration. The access control unit 72 causes the terminal device 11 to access the portal service application 61.

The portal service application 61 confirms whether the access to the URL for the real registration is valid (whether the access is made to the generated URL for the real registration, and that the access is within the validity term). When the access is valid, the portal service application 61 causes the display device 42 of the terminal device 11 to display the screen for the real registration.

The user operates the input device 41 of the terminal device 11, and inputs information for performing the real registration of the tenant ID in the real registration screen, and then requests the real registration. In the information input to the real registration screen is tenant information including the tenant ID, the name, and the registration code, and user information including the user ID and the password for login, and address information.

Note that either the tenant ID or the registration code already input by the user at the time of tentative registration of the tenant ID, may be displayed in an input state in advance. From the viewpoint of enhancing security, it is assumed that at least one of the information items of the tenant ID and the registration code, to be input by the user, is not described in the mail describing the URL for the real registration, as described above.

When the real registration is requested from the terminal device 11 of the user, the portal service application 61 requests the license authentication unit 76 to perform a validation process (real registration process) of a license based on the tenant ID and the registration code input in the real registration screen.

The license authentication unit 76 that has received the request executes the license authentication process, and determines whether the tenant ID and the registration code input in the real registration screen are stored in the license information stored by the management information storage unit 91. When the input tenant ID and registration code are stored in the license information, and the registration state associated with the stored tenant ID and the registration code is "not registered", the license authentication unit 76 determines that the input tenant ID and registration code are valid information.

When the input tenant ID and registration code are determined to be valid information, the license authentication unit 76 requests the setting registration unit 74 to change the state of the license information. The setting registration unit 74 changes the value of the registration state associated with the valid tenant ID and registration code to "registered", in the license information stored by the management information storage unit 91.

When the validation process of the license is completed, the portal service application 61 requests the setting registration unit 74 to register the tenant information and the user information input to the real registration screen in the terminal device 11 by the user. The setting registration unit 74 registers, in the tenant information stored by the management information storage unit 91, the name that is input as part of the tenant information in the real registration screen. Furthermore, the setting registration unit 74 registers, in the user information stored by the management information storage unit 91, a tenant ID, a user ID and a password for login, and address information.

When the registration of settings of various information items is completed by the setting registration unit 74, the portal service application 61 causes the display device 42 of the terminal device 11 to display a tenant registration completion screen. Furthermore, the portal service application 61 creates a mail describing a tenant registration completion report, and requests the mail transmission unit 73 to send the mail. The mail transmission unit 73 sends a mail describing the tenant registration completion report, to the mail address (address information registered in the tenant information) input for performing the tentative registration of the tenant ID in the terminal device 11 by the user.

For example, the user confirms the tenant registration completion screen displayed on the display device 42 of the terminal device 11. By completing the registration of the tenant ID, the user ID, and the password, from next time, the user can request to login from the top screen of the portal site. By logging in from the top screen of the portal site, the user can perform the process of registering the tenant information, the user information, and the device information associated with the tenant ID.

In step S4, the user such as an administrator operates the input device 41 of the terminal device 11, and inputs the tenant ID, the user ID, and the password from the top screen of the portal site, and then requests to log in.

The portal service application 61 that has received the request to log in, requests the user authentication unit 77 to perform user authentication. The user authentication unit 77 determines (match) whether a combination of the tenant ID, and a user ID and a password for login received from the terminal device 11 is stored in the user information stored by the management information storage unit 91.

When the combination of the tenant ID, and a user ID and a password for login received from the terminal device 11 is stored, the user authentication unit 77 authenticates the user who has requested the login. When the user is authenticated by the user authentication unit 77, the portal service application 61 allows the login.

The user who has logged into the portal service application 61 can register the service ID of the service that the user desires to use. The portal service application 61 causes the display device 42 of the terminal device 11 to display a service registration screen for registering the service ID. The user operates the input device 41 of the terminal device 11, and inputs the service ID from the service registration screen displayed on the display device 42 of the terminal device 11, and then requests service registration. The terminal device 11 requests the portal service application 61 to perform service registration, based on the operation by the user.

When service registration is requested from the terminal device 11, the portal service application 61 refers to the license information stored by the management information storage unit 91, and the user selects an ID that matches the service ID input to the service registration screen. The portal service application 61 acquires the license type (service type) associated with the selected ID.

Furthermore, the portal service application 61 refers to the tenant information stored by the management information storage unit 91, and acquires usage district information associated with the tenant ID of the user who has logged in. The portal service application 61 causes the display device 42 of the terminal device 11 to display the terms of use according to the acquired type of license and the usage district information, and prompts the user to select whether to agree with the terms of use.

The service providing system 2 saves terms of use (binding terms and conditions) according to the country/area of using each service type (license type). The portal service application 61 performs display control of displaying the terms of use according to the usage district information input by the user for performing tentative registration of the tenant ID, and the service type for which service registration is requested, and can prompt the user to select whether to agree with the terms of use.

When the user operates the input device 41 of the terminal device 11 and makes a selection of agreeing with the terms of use, the portal service application 61 requests the license authentication unit 76 to perform a service registration process based on the tenant ID of the user who has logged in and the service ID input to the service registration screen.

The license authentication unit 76 confirms (match) whether the service ID input to the service registration screen is stored as an ID in the license information stored by the management information storage unit 91. When the service ID input to the service registration screen is stored as an ID, the license authentication unit 76 determines that the service ID is a valid ID (authenticates the service ID).

When the service ID is determined to be a valid service ID, the license authentication unit 76 requests the setting registration unit 74 to register a service ID. The setting registration unit 74 registers the service ID and the service type in association with the tenant ID of the user who has logged in, in the tenant information stored by the management information storage unit 91.

In step S5, the user such as an administrator performs device registration of the service ID. The user operates the input device 41 of the terminal device 11, and causes the display device 42 of the terminal device 11 to display a device registration screen. The user operates the input device 41 of the terminal device 11, and inputs, in the device registration screen, the service ID, and the device ID of the device in which the usage of the service becomes possible by the service ID, and requests device registration of the service ID.

When device registration of the service ID is requested from the terminal device 11, the portal service application 61 requests the license authentication unit 76 to perform a device registration process of the service ID, based on the tenant ID of the user who has logged in, and the service ID and the device ID input to the device registration screen.

The license authentication unit 76 determines (match) whether the combination of the tenant ID of the user who has logged in and the service ID input to the device registration screen is stored in the tenant information stored by the management information storage unit 91.

When the combination of the tenant ID of the user who has logged in and the service ID input to the device registration screen is stored, the license authentication unit 76 refers to the license information stored by the management information storage unit 91. The license authentication unit 76 determines whether the registration state associated with the service ID input to the device registration screen is "not registered".

When the registration state is "not registered", the license authentication unit 76 requests the setting registration unit 74 to perform device registration of the service ID. Note that a service ID whose registration state is "not registered", is a service ID for which device registration of a service ID has not been performed. The setting registration unit 74 registers, in the device information stored by the management information storage unit 91, the tenant ID of the user who has logged in, and the service ID and the device ID input to the device registration screen.

Furthermore, the setting registration unit 74 refers to the tenant information saved by the management information storage unit 91, and acquires the service type and validity term specified from the tenant ID and the service ID. The setting registration unit 74 registers, in the device information stored by the management information storage unit 91, the service type, the usage start date, and the usage end date, based on the acquired service type and validity term.

As the usage start date, the date when the device registration of the service ID has been performed, is stored. As the usage end date, the last date calculated based on the validity term acquired from the tenant information (for example, one year) and the usage start date, is stored.

For example, the usage start date may be specified in the request for service registration of step S4. When it is made possible to specify the usage start date, the usage start date specified in the request for service registration is stored as the usage start date of the device information. When the device registration of the service ID has been completed, the setting registration unit 74 changes the value of the registration state associated with the service ID for which device registration has been performed, to "registered", in the license information stored by the management information storage unit 91.

As described above, by the process from tenant registration to service registration, the user such as an administrator is able to perform tenant registration, service ID registration, and device registration of the service ID, by accessing the service providing system 2 from the terminal device 11. In this manner, the user is able to easily complete the formalities needed for receiving the service to be provided.

User Authentication/Device Authentication Function Included in Service Providing System 2

Figure 11:
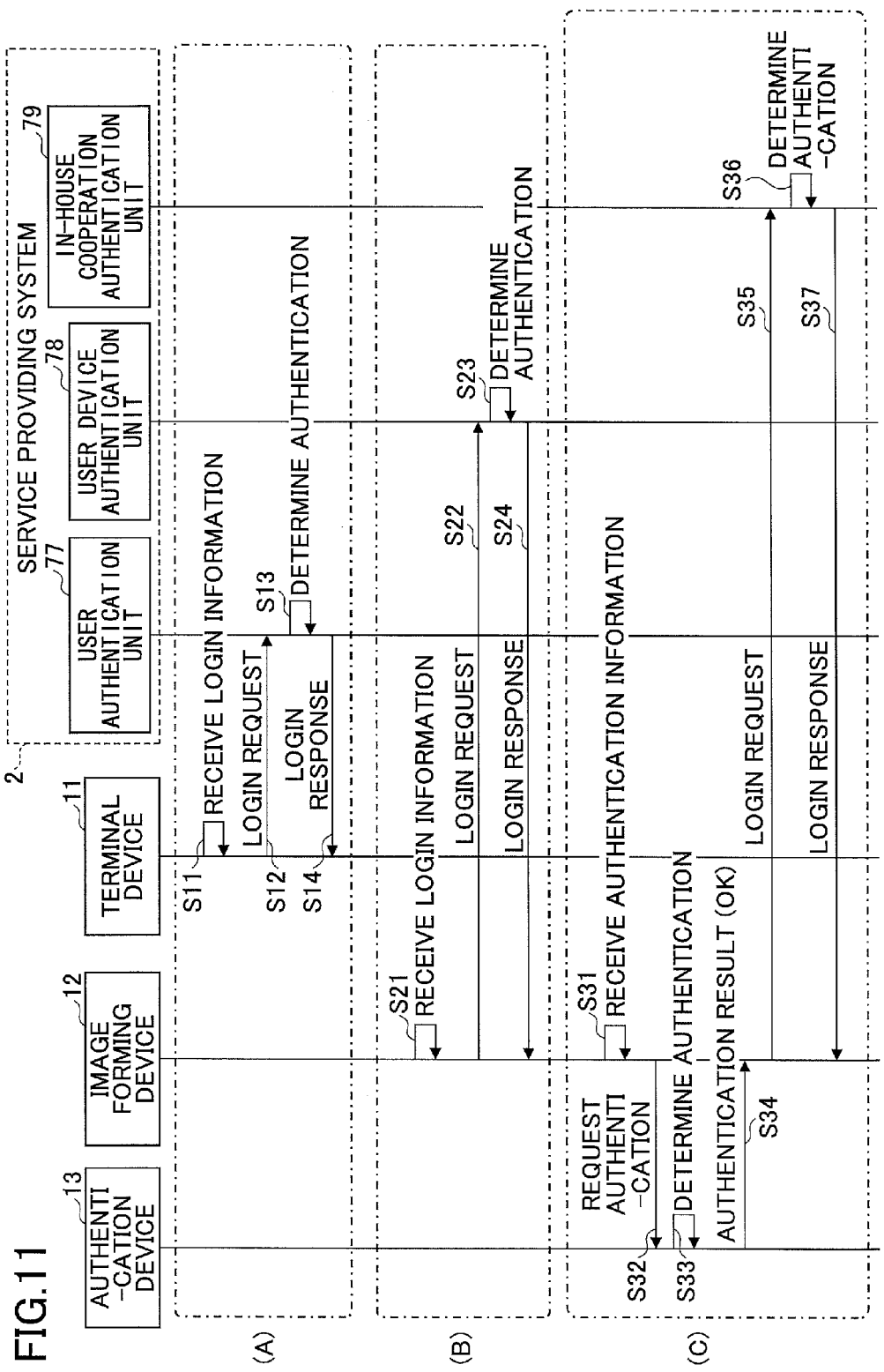
FIG. 11 is a sequence diagram of an example of a user authentication/device authentication process.

FIG. 11 is a sequence diagram of an example of the user authentication/device authentication process. FIG. 11(A) expresses user authentication from the terminal device 11 in which device authentication is not needed. FIG. 11(B) expresses user device authentication from the image forming device 12 in which device authentication is needed. FIG. 11(C) expresses in-house cooperation authentication from the image forming device 12 in which device authentication is needed.

As illustrated in FIG. 11(A), in user authentication from the terminal device 11, the user inputs, from the top screen of the portal site, a tenant ID, a user ID, and a password, as login information. In step S11, the terminal device 11 receives the login information input from the user.

In step S12, the terminal device 11 makes a login request to the service providing system 2, by using the login information input by the user. The access control unit 72 of the service providing system 2 requests the user authentication unit 77 to perform user authentication.

In step S13, the user authentication unit 77 confirms whether there is login information received from the terminal device 11, in the user information stored by the management information storage unit 91. When there is login information received from the terminal device 11, in the user information stored by the management information storage unit 91, the user authentication unit 77 determines that user authentication is successful. When there is no login information received from the terminal device 11, the user authentication unit 77 determines that user authentication is unsuccessful.

When the user authentication is successful, the access control unit 72 allows the login from the terminal device 11 to the service providing system 2 (login for using service). In step S14, the access control unit 72 sends, to the terminal device 11, the login response based on the result of the user authentication by the user authentication unit 77.

In FIG. 11(B) and FIG. 11(C), in the user authentication for logging into the service providing system 2, the image forming device 12 saves a setting of using the user ID and the password for login, or using the user ID for in-house authentication. Note that the setting of using the user ID and the password for login, or using the user ID for in-house authentication, may be changed according to need. Furthermore, it is assumed that the image forming device 12 has the tenant ID and the device ID saved in the storage area in itself.

In the case of a setting to use the user ID and the password for login, in order to log into the service providing system 2, the image forming device 12 performs user device authentication as illustrated in FIG. 11 (B).

In step S21, the image forming device 12 displays an input screen for the user to input the user ID and the password for login. The user inputs the user ID and the password for login, from the input screen displayed on the image forming device 12. The image forming device 12 receives the user ID and the password for login, input by the user.

In step S22, the image forming device 12 sends, to the service providing system 2 as login information, the user ID and the password for login input by the user, and the tenant ID and the device ID saved in the storage area of itself, and makes a login request. The access control unit 72 of the service providing system 2 requests the user device authentication unit 78 to perform user device authentication.

In step S23, the user device authentication unit 78 confirms whether there is a combination of a tenant ID and a device ID included in the login information received from the image forming device 12, in the device information saved by the management information storage unit 91. When there, is a combination of the tenant ID and the device ID, the user device authentication unit 78 determines that the device authentication is successful. When there is no combination of the tenant ID and the device ID, the user device authentication unit 78 determines that the device authentication is unsuccessful.

Furthermore, the user device authentication unit 78 confirms whether there is a combination of a tenant ID, and a user ID and a password for login included in the login information received from the image forming device 12, in the user information stored by the management information storage unit 91.

When there is a combination of the tenant ID, and the user ID and the password for login included in the login information received from the image forming device 12, in the user information stored by the management information storage unit 91, the user device authentication unit 78 determines that the user authentication is successful. When there is no combination of the tenant ID, and the user ID and the password for login included in the login information received from the image forming device 12, the user device authentication unit 78 determines that the user authentication is unsuccessful.

When the device authentication and the user authentication are successful, the access control unit 72 allows the login from the image forming device 12 to the service providing system 2 (login for using service). In step S24, the access control unit 72 sends, to the terminal device 11, a login response based on the results of device authentication and user authentication by the user device authentication unit 78.

In the case of the setting to use a user ID for in-house authentication, in order to log into the service providing system 2, the image forming device 12 performs the in-house cooperation authentication illustrated in FIG. 11 (C). First, the user executes user authentication in the image forming device 12. The user authentication executed in the image forming device 12 is user authentication that is executed for using the image forming device 12 or a particular function of the image forming device 12. In this case, a description is given of an example where the authentication device 13 performs user authentication, by using a card ID saved in an ID card carried by the user.

In step S31, the user performs user authentication, by causing a card reader (not illustrated) connected to the image forming device 12 to read a card ID. In step S32, the image forming device 12 sends the card ID read by the card reader to the authentication device 13, and makes an authentication request.

In step S33, the authentication device 13 performs authentication determination by using the card ID received from the image forming device 12. The authentication device 13 stores, in the storage area, user authentication information in which card IDs and user IDs are associated with each other. The authentication device 13 refers to the user authentication information in which card IDs and user IDs are associated with each other, and confirms whether it is possible to specify a user ID associated with the card ID received from the image forming device 12.

When a user ID associated with the card ID is specified, the authentication device 13 determines that user authentication is successful. In step S34, the authentication device 13 sends, to the image forming device 12, the authentication result indicating that authentication is successful, together with the specified user ID.

Next, for example, the user can request to log into the service providing system 2, by selecting to log into the service providing system 2 from the display screen of the image forming device 12. In step S35, the user requests to log into the service providing system 2 from the image forming device 12.

When login to the service providing system 2 is requested from the user, the image forming device 12 sends, to the service providing system 2 as login information, the specified user ID, and the tenant ID and device ID saved in the storage area of itself, and makes a login request. The access control unit 72 of the service providing system 2 requests the in-house cooperation authentication unit 79 to perform in-house cooperation authentication.

In step S36, the in-house cooperation authentication unit 79 confirms whether there is a combination of the tenant ID and device ID included in the login information received from the image forming device 12, in the device information stored by the management information storage unit 91.

When there is a combination of the tenant ID and the device ID, the in-house cooperation authentication unit 79 determines that the device authentication is successful. When there is no combination of the tenant ID and the device ID, the in-house cooperation authentication unit 79 determines that the device authentication is unsuccessful.

Furthermore, the in-house cooperation authentication unit 79 confirms whether there is a combination of the tenant ID and the user ID for in-house authentication included in the login information received from the image forming device 12, in the user information stored by the management information storage unit 91. When there is a combination of the tenant ID and the user ID for in-house authentication included in the login information received from the image forming device 12, in the user information stored by the management information storage unit 91, the in-house cooperation authentication unit 79 determines that user authentication is successful.

When there is no combination of the tenant ID and the user ID for in-house authentication included in the login information received from the image forming device 12, the in-house cooperation authentication unit 79 determines that user authentication is unsuccessful.

The access control unit 72 allows the login to the service providing system 2 from the image forming device 12 (login for using service), when the device authentication and the user authentication are successful. In step S37, the access control unit 72 sends, to the terminal device 11, a login response based on the results of device authentication and user authentication by the in-house cooperation authentication unit 79.

Note that when the device authentication is successful but the user authentication is unsuccessful by the in-house cooperation authentication unit 79, the service providing system 2 may cause the image forming device 12 to display an input screen for the user to input a user ID and a password for login.

In this case, the user can request login again, by inputting the user ID and the password for login in the input screen. The image forming device 12 sends, to the user device authentication unit 78 of the service providing system 2, the user ID and the password for login input by the user, and the tenant ID saved in the storage area of itself, and makes a login request.

The user device authentication unit 78 confirms whether there is a combination of the tenant ID, and the user ID and the password for login received from the image forming device 12, in the user information stored by the management information storage unit 91.

When there is a combination of the tenant ID, and the user ID and the password for login received from the image forming device 12, in the user information stored by the management information storage unit 91, the user device authentication unit 78 determines that user authentication is successful. The access control unit 72 allows the login to the service providing system 2.

Furthermore, the setting registration unit 74 registers, in the user information stored by the management information storage unit 91, the user ID for in-house authentication received from the image forming device 12, in association with the tenant ID and the user ID and the password for login received from the image forming device 12. As described above, by registering, in the user information, the user ID for in-house authentication received from the image forming device 12, in association with the tenant ID and the user ID and the password for login, the user is able to log in by using the user ID for in-house authentication from next time.

Data Processing Function included in Service Providing System 2

In the service providing system 2, various data processes requested from a process request unit 101 of the service application 51, are executed as follows by the data processing control unit 81, the processing queue 82, the data process request unit 83, and the data processing unit 84 of the platform 52.

Figure 12:
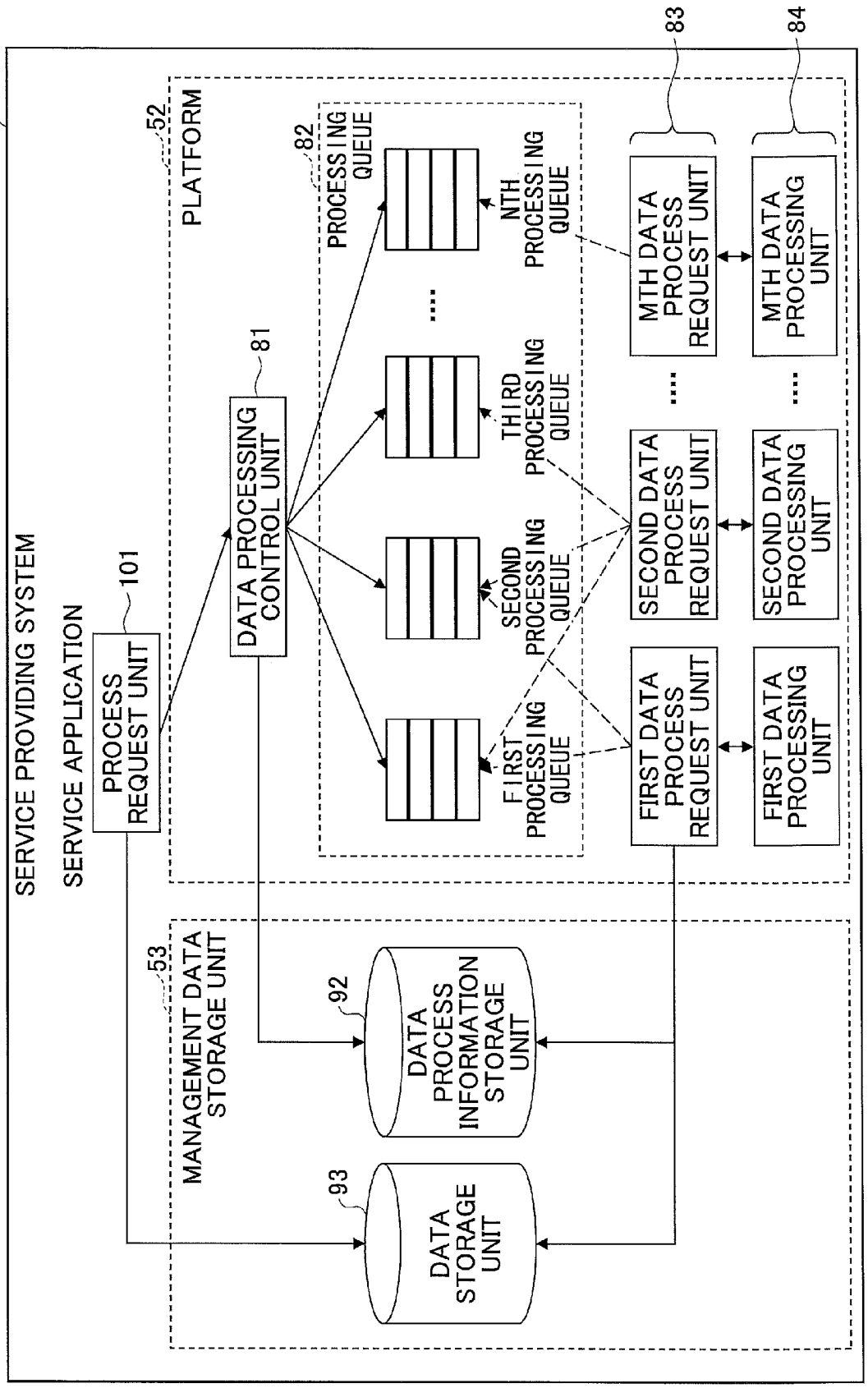
FIG. 12 illustrates an example of a data processing function of the service providing system.

FIG. 12 illustrates an example of a data processing function of the service providing system 2. The process request unit 101 of the service application 51 records data that is the target of processing, in the data storage unit 93 of the management data storage unit 53. The data that is the target of processing is processing target data such as application data and image data.

Furthermore, the process request unit 101 sends a data processing request (hereinafter, "request") to the data processing control unit 81 of the platform 52. The request to be sent includes processing contents of the data process and information of the recording destination of the process target data (for example, a URL).

The data processing control unit 81 analyzes the received request, and registers a message in the processing queue 82 (message queue) according to the process contents of the data process. Note that the processing queue 82 is provided for each process content of the data process.

Furthermore, the data processing control unit 81 registers the information of the request in the data processing information storage unit 92 of the management data storage unit 53.

The information of the request is, for example, the recording destination of the processing target data, the process contents of the data process, and the state of the request.

The state of the request is, for example, "received", "executing", and "completed". Note that the state of the request expresses the status indicating the process situation of the data process. The state of the request becomes "received", at the stage when the data processing control unit 81 has registered the information of the request.

Each data process request unit 83 monitors one or more processing queue 82 assigned to itself. That is to say, each data process request unit 83 monitors the request of the process contents of one or more data processes. Each data process request unit 83 acquires a message registered in the processing queue 82 that it is monitoring.

For example, in FIG. 12, the "first data process request unit 83" monitors the "first processing queue 82" and the "second processing queue 82", which have different process contents of data. Furthermore, "second data process request unit 83" monitors the "first processing queue 82" through the "third processing queue 82", which have different process contents of data. In the example of FIG. 12, the "first data process request unit 83" and the "second data process request unit 83" monitor overlapping queues, i.e., the "first processing queue 82" and the "second processing queue 82".

Note that the assignment of processing queues 82 monitored by the data process request unit 83 may be set and changed according to need. For example, the assignment of processing queues 82 monitored by each data process request unit 83 may be set and changed according to the request frequency and the processing time of each process content of the data process.

The data process request unit 83 acquires information of the request from the data processing information storage unit 92, based on a message acquired from the processing queue 82 that it is monitoring. The data process request unit 83 causes the data processing unit 84 to execute a data process of the request, based on the record destination of the process target data and the process contents of the data process included in the acquired information of the request.

Next, the data process request unit 83 updates the information of the request from the execution result of the data process executed by the data processing unit 84, and registers the updated information of the request in the data processing information storage unit 92. The updating of the information of the request includes a process of deleting the process contents of the data process executed from the request, a process of changing the state of the request when there is a change, etc. Furthermore, when the information of the request includes process contents of a data process to be performed next, the data process request unit 83 registers a message in the processing queue 82 corresponding to the process contents of the data process.

Note that when the process target data before and after the data process becomes different data by causing the data processing unit 84 to execute the data process of the request, the data process request unit 83 records the process target data after the process in the data storage unit 93. Furthermore, the data process request unit 83 updates the information of the request, according to the information of the recording destination of the process target data after the process.

Figure 13:
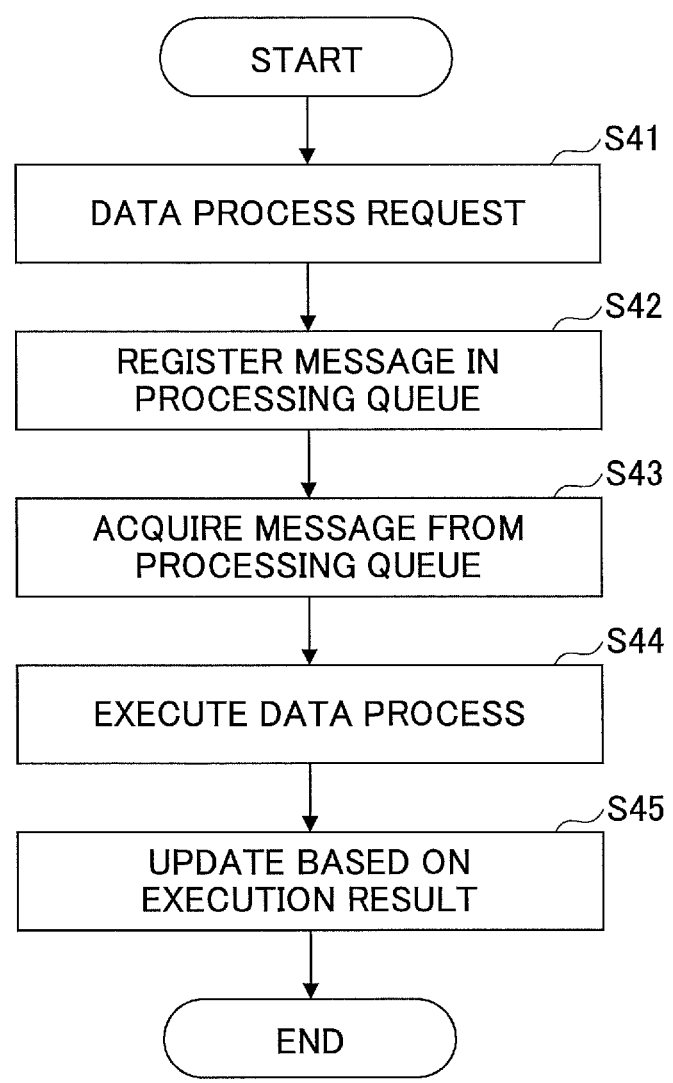
FIG. 13 is a flowchart of an example of processing procedures of a data processing function included in the service providing system.

FIG. 13 is a flowchart of an example of processing procedures of the data processing function included in the service providing system 2. In step S41, the process request unit 101 of the service application 51 records the process target data in the data storage unit 93 of the management data storage unit 53. Furthermore, the process request unit 101 sends a request (data processing request) to the data processing control unit 81 of the platform 52.

In step S42, the data processing control unit 81 analyzes the request, and registers a message in the processing queue 82 according to the process contents of the data process. Furthermore, the data processing control unit 81 registers information of the request in the data processing information storage unit 92 of the management data storage unit 53.

In step S43, each data process request unit 83 acquires the message registered in the processing queue 82 that it is monitoring, from the processing queue 82. In step S44, the data process request unit 83 acquires information of the request from the data processing information storage unit 92, based on the acquired message. Then, the data process request unit 83 causes the data processing unit 84 to execute a data process of the request, based on the acquired information of the request.

In step S45, the data process request unit 83 updates the information of the request from the execution result of the data process executed by the data processing unit 84, registers the updated information of the request in the data processing information storage unit 92, and then ends the process of the flowchart of FIG. 13.

Note that when the information of the request includes process contents of a data process to be performed next, the data process request unit 83 registers a message in the processing queue 82 corresponding to the process contents of the data process, and then ends the process of the flowchart of FIG. 13.

In the following, specific examples of the process contents of the data process are given; however, the process contents of the data process are not limited to these specific examples. As specific examples of the process contents of the data process, first, there is a data process of converting the data format of the process target data.

For example, a data process of converting image data into PDF (Portable Document Format) data is an example of a data process of converting the data format of the process target data. In the data process of converting image data into PDF data, the process contents of the data process are expressed as "image2pdf".

Furthermore, a data process of converting PDF data into PDL (Page Description Language) data is also an example of a data process of converting the data format of the process target data. In the data process of converting PDF data into PDL data, the process contents of the data process are expressed as "pdf2pdl".

Furthermore, a data process of converting document data of Microsoft (registered trademark) Office (registered trademark) into PDL data, is also an example of a data process of converting the data format of the process target data. In the data process of converting Office document data into PDL data, the process contents of the data process are expressed as "office2pdl".

As a second specific example of the process contents of a data process, there is a data process of dividing the process contents of a single data process into process contents of a plurality of data processes, and converting the process contents into requests of the respective data processing units 84 according to the process contents of the data processes obtained as a result of the division.

For example, the data process of converting image data into PDL data may be realized by dividing the data process into a data process of converting image data into PDF data, and a data process of converting PDF data into PDL data. Note that in the data process of converting image data into PDL data, the process contents of the data process are expressed as "image2pdl".

For example, the data processing unit 84 executes a data process of dividing the request of a data process of "image2pdl" into requests of data processes of "image2pdf" and "pdf2pdl". As described above, the data processing units 84 include units for performing a data process of dividing a request of a single data process into requests of a plurality of data processes.

As described above, for example, when there is no data processing unit 84 capable of executing a data process of "image2pdl", data processes of "image2pdf" and "pdf2pdl" are performed in cooperation with each other, to execute the desired data process of "image2pdl".

Figure 14:
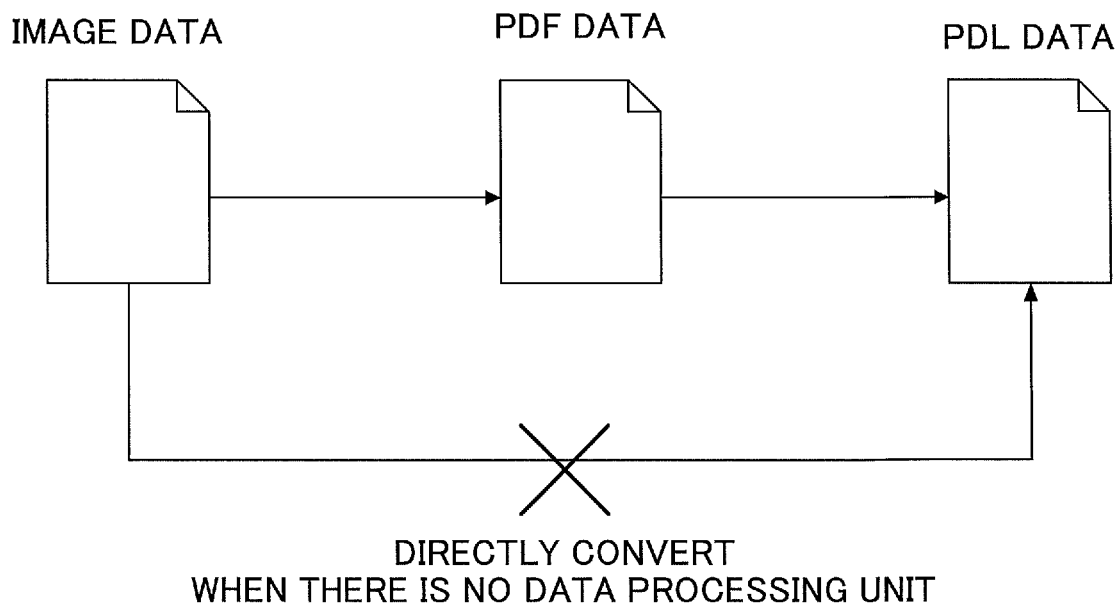
FIG. 14 illustrates a data process of dividing process contents of a single data process into process contents of a plurality of data processes.

FIG. 14 illustrates a data process of dividing process contents of a single data process into process contents of a plurality of data processes. FIG. 14 expresses a case where there is no data processing unit 84 capable of executing a data process of "image2pdl".

In this case, FIG. 14 expresses that the desired data process of "image2pdl" can be executed by performing data processes of "image2pdf" and "pdf2pdl" in cooperation with each other.

In the service providing system 2 according to the present embodiment, it is possible to perform a data process of dividing the process contents of a single data process into process contents of a plurality of data processes, and therefore it is possible to flexibly handle increases in the types of process contents of data processes.

Furthermore, as a third specific example of the process contents of a data process, there is a data process of cooperating with an external storage. One example of a data process of cooperating with an external storage is a data process of requesting the external cooperation authentication unit 80 to log into the online storage 32, by using an account and a password for the online storage corresponding to the user who has logged in.

Other examples of a data process of cooperating with an external storage are a data process of saving data in the online storage 32 to which the user has logged in, and a data process of acquiring data from the online storage 32 to which the user has logged in.

Cooperation with Online Storage 32

Figure 15:
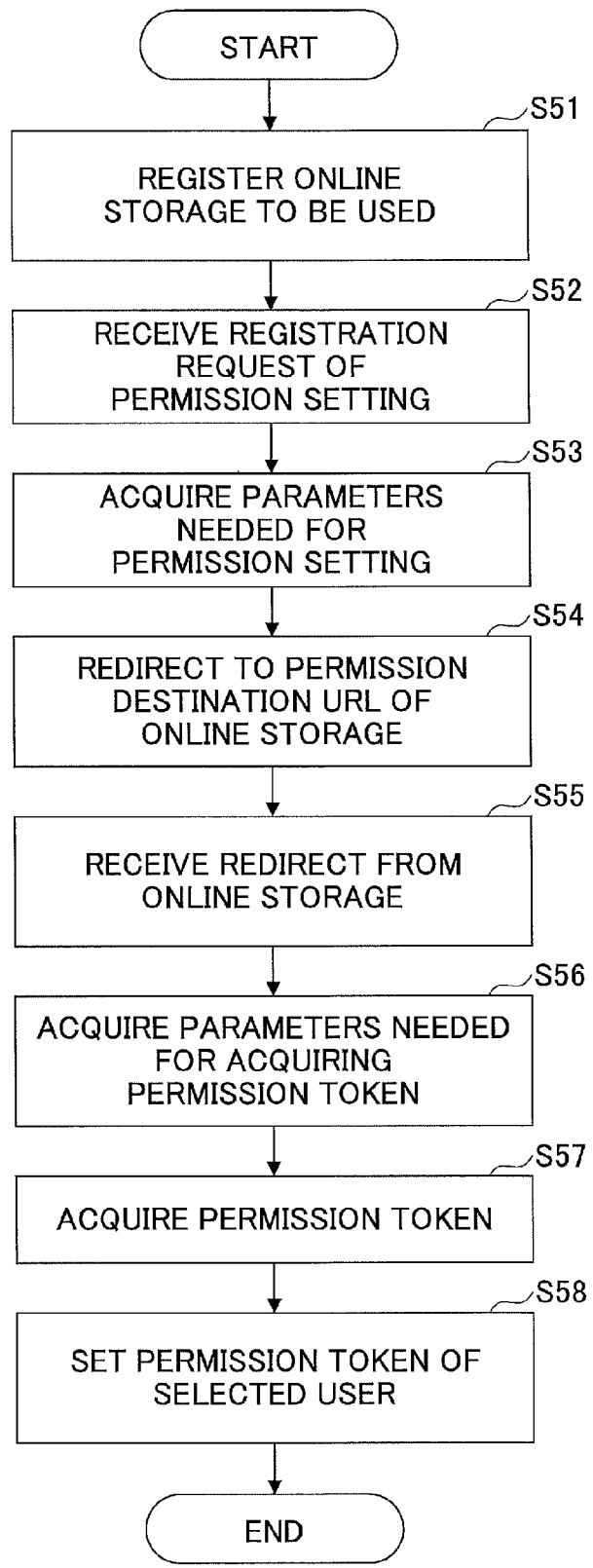
FIG. 15 is a flowchart of an example of a permission setting with respect to an online storage.

FIG. 15 is a flowchart of an example of a permission setting with respect to the online storage 32. The user such as an administrator operates the input device 41 of the terminal device 11, inputs a tenant ID, a user ID and a password from the top screen of the portal site, and then requests to log in. The portal service application 61 that has received the request to log in, allows the login, and then causes the display device 42 of the terminal device 11 to display a registration screen of an external service.

In step S51, in the registration screen of an external service, the user selects the online storage (external service) 32 that he desires to use, from a list of external services stored in the external service information of the management information storage unit 91, and requests to register the selected online storage 32.

The portal service application 61, which has received the request for registration, requests the setting registration unit 74 to register the online storage 32 selected by the user. The setting registration unit 74 associates the tenant ID of the user who has logged in, with the tenant information in the management information storage unit 91, and registers the online storage 32 selected by the user.

In step S52, the user selects, in the permission setting screen of the portal site, the user ID of the user for which the permission setting is to be applied, the external service ID performing the permission setting (or the service name of the external service), and the scope to be set for the user, and requests the registration of the permission setting. The portal service application 61 receives the request of the permission setting.

In step S53, the portal service application 61 that has received the request for the permission setting, requests the permission setting processing unit 75 to perform permission setting. The permission setting processing unit 75 acquires parameters needed for the permission setting, from external service information of the management information storage unit 91. Note that parameters needed for the permission setting include an external service ID and a scope, and also a client ID associated with the selected external service ID, a redirect destination URL, and an arbitrary session key for maintaining the session.

In step S54, the permission setting processing unit 75 that has acquired the parameters needed for permission setting, acquires, from the external service information of the management information storage unit 91, a permission destination URL associated with the selected external service ID. The permission setting processing unit 75 causes the request including the parameters needed for permission setting (request in which the parameters needed for permission setting are set as the query of the GET request), to be redirected from the terminal device 11 to the permission destination URL.

By redirecting the request from the terminal device 11 to the permission destination URL, permission setting is performed between the terminal device 11 and the online storage 32. Note that after the permission setting, as the request is redirected from the online storage 32 to the permission setting processing unit 75, the session in the HTTP level is interrupted. Thus, in order to maintain the same session, a session key is used.

The redirected online storage 32 causes the display device 42 of the terminal device 11 to display a login screen. The user operates the input device 41 of the terminal device 11, inputs the account and the password from the login screen, and then requests to log in. The online storage 32 to which a login request is made, receives the login request.

When the login is successful, the online storage 32 causes the display device 42 of the terminal device 11 to display a permission screen. The user confirms the permission screen. When permission is to be given, the user operates the input device 41 of the terminal device 11, and requests the permission by pressing a permission button displayed on the permission screen, for example. The online storage 32 that has received the request for permission, registers the permission.

In step S55, the online storage 32 causes a permission code indicating that permission is given and a session key, to be redirected from the terminal device 11 to the redirect destination URL.

In step S56, the permission setting processing unit 75 of the service providing system 2 receives a permission code. Note that if the user has already logged in when redirecting to the online storage 32, the display of the login screen is omitted.

The permission setting processing unit 75 that has received the permission code in step S56, acquires, from the external service information of the management information storage unit 91, the parameters needed for acquiring a permission token. The parameters needed for acquiring a permission token includes the received permission code, and also the client ID and a client secret associated with the external service ID of the online storage 32 that has sent the permission code.

In step S57, the permission setting processing unit 75 sends, to the online storage 32, the acquired client ID and client secret, and the received permission code, and requests to acquire the permission token. The online storage 32 validates the received permission code, and sends the permission token to the permission setting processing unit 75 of the service providing system 2.

In step S58, the permission setting processing unit 75 that has received the permission token, requests the setting registration unit 74 to register the permission token. The setting registration unit 74 registers, in the user information of the management information storage unit 91, the user to which the permission setting selected in the permission setting screen is to be applied, the received permission token, and the scope, in association with each other.

When the registration of the permission token is completed, the permission setting processing unit 75 reports the completion of the registration to the portal service application 61. The portal service application 61 causes the display device 42 of the terminal device 11 to display a screen indicating the setting results of the permission setting.

Note that when the online storage 32 sends the permission token to the service providing system 2, the online storage 32 may also send together the validity term of the permission token, and a refresh token used for reissuing a permission token when the validity term expires.

Figure 16:
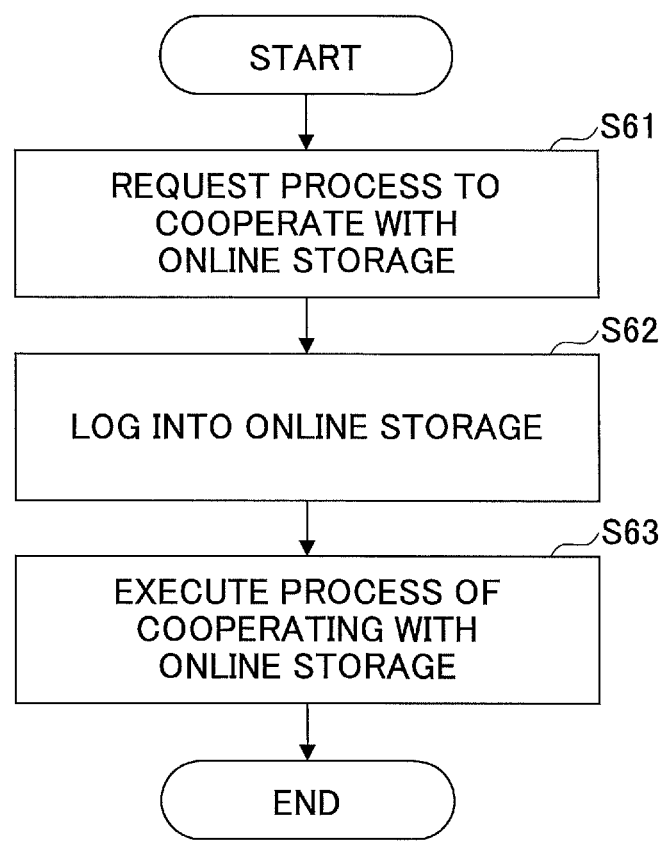
FIG. 16 is a flowchart of an example of a cooperation process with the online storage.

FIG. 16 is a flowchart of an example of a cooperation process with the online storage 32. In step S61, the user who has logged into the service providing system 2 requests a process of cooperating with the online storage 32, from the terminal device 11 or the image forming device 12.

When a request for a process to cooperate with the online storage 32 is received, in step S62, the external cooperation authentication unit 80 of the service providing system 2 performs the process of logging into the online storage 32.

The external cooperation authentication unit 80 receives a request to log into the online storage 32, from the data processing unit 84, for example. The external cooperation authentication unit 80 acquires, from the user information of the management information storage unit 91, information needed for the login process associated with the user that has logged into the service providing system 2, and the online storage 32 for which the login process is to be performed.

Specifically, the external cooperation authentication unit 80 acquires information needed for the login process to the online storage 32, associated with the tenant ID, and the user ID and the password for login, of the user who has logged into the service providing system 2.

For example, in the case of the user information of FIG. 6, when a request to log into the "online storage A" is received, the external cooperation authentication unit 80 acquires an account and a password as information needed for the login process to the "online storage A".

Furthermore, in the case of the user information of FIG. 6, when a request to log into the "online storage B" is received, the external cooperation authentication unit 80 acquires an account and a permission token as information needed for the login process to the "online storage B".

When the online storage 32 to be cooperated with is an external service that does not have a permission setting like "online storage A" and a login process is to be performed, the external cooperation authentication unit 80 requests login to the "online storage A" by using an account and a password. The account and the password are an example of authentication information with respect to an external service.

The "online storage A" that has received the request for login executes authentication with respect to the received account and password. When the authentication is successful, the "online storage A" sends a response indicating to allow the login, to the external cooperation authentication unit 80. When the authentication is unsuccessful, the "online storage A" sends a response indicating not to allow the login, to the external cooperation authentication unit 80.

The external cooperation authentication unit 80 receives a response indicating to allow the login, from the "online storage A". Accordingly, the service providing system 2 is able to perform the uploading (saving) of data in the "online storage A", and to perform the downloading (acquiring) of the data from the "online storage A".

As described above, as the external cooperation authentication unit 80 receives a response indicating to allow the login from the online storage 32, in step S63, the service providing system 2 is able to execute a process of cooperating with the online storage 32.

When the online storage to be cooperated with is an external service that has a permission setting like "online storage B", the external cooperation authentication unit 80 requests login to the "online storage B" by using an account and a permission token.

The account and the permission token are an example of authentication information with respect to an external service. The "online storage B" that has received the request for login, confirms the validity of the received account and permission token. When the validity is confirmed, the "online storage B" sends a response indicating to allow the login, to the external cooperation authentication unit 80. When the authentication is unsuccessful, the "online storage B" sends a response indicating not to allow the login, to the external cooperation authentication unit 80.

The external cooperation authentication unit 80 receives a response indicating to allow the login, from the "online storage B". Accordingly, in step S63, the service providing system 2 is able to realize a process of cooperating with the online storage 32, within a usage range set by the scope.

Output Control of Data: Process Block

Next, a description is given of an example of data output control of a job in the information processing system 1 according to the present embodiment described above. Note that in the following, a description is given of an example of controlling, based on rule information set in advance, a method of outputting data of a job input by the terminal device 11 in the office of the information processing system 1. Here, for example, rule information is for setting the output method by setting the contents of the data to be printed as a condition.

Figure 17:
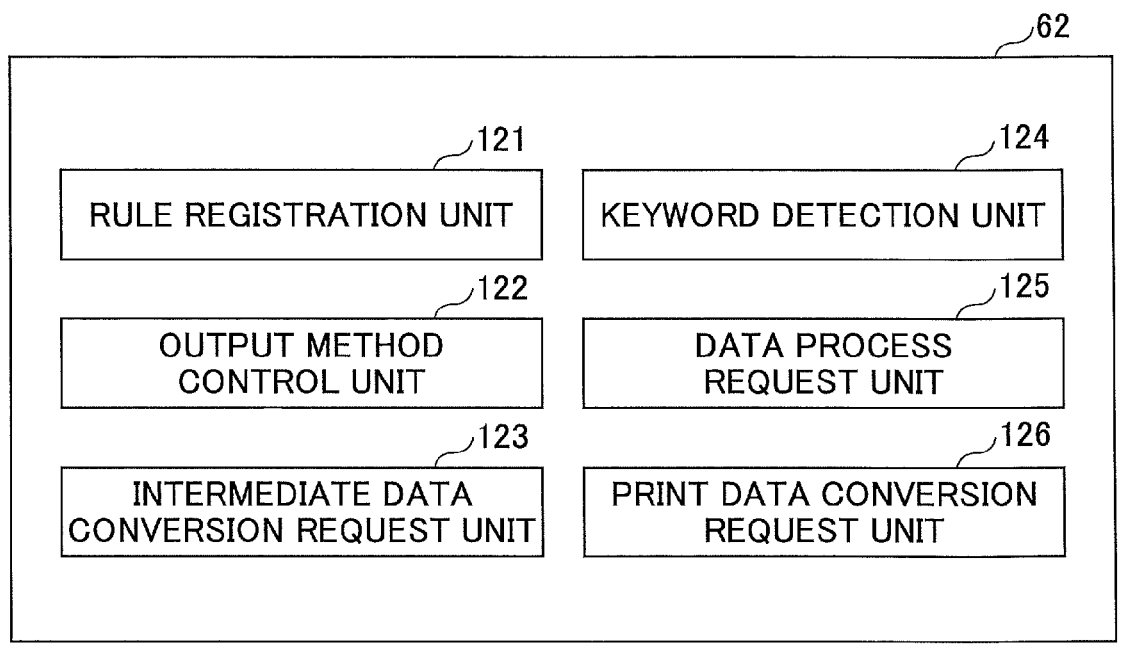
FIG. 17 is a process block diagram of an example of a print service application.

FIG. 17 is a process block diagram of an example of a print service application. As illustrated in FIG. 17, the print service application 62 includes a rule registration unit 121, an output method control unit 122, an intermediate data conversion request unit 123, a keyword detection unit 124, a data process request unit 125, and a print data conversion request unit 126.

When the rule registration unit 121 receives a request to register rule information from the terminal device 11, the rule registration unit 121 registers the received rule information in association with the tenant information of the user stored by the management information storage unit 91 described above.

When the output method control unit 122 receives a request to input a job from the terminal device 11, in order to analyze the document data of the job, the output method control unit 122 requests the intermediate data conversion request unit 123 to convert the document data of the job into intermediate data. For example, the output method control unit 122 acquires the rule information stored in the management information storage unit 91, based on a user name that has logged in, and requests the keyword detection unit 124 to detect a keyword based on the rule information, from the converted intermediate data.

The output method control unit 122 determines the data output method of the job, based on the keyword and rule information obtained from the keyword detection unit 124. Here, for example, the output method control unit 122 requests a data process with respect to the intermediate data according to the determined result, and requests the print data conversion request unit 126 to convert the intermediate data on which a data process has been executed, into print data.

The intermediate data conversion request unit 123 makes a process request to the data processing control unit 81 to cause the data processing unit 84 to convert the document data of the job into intermediate data, according to a request from the output method control unit 122. Note that, for example, the intermediate data is data that is converted from original data (document data) for extracting a predetermined keyword; the intermediate data may be edited while maintaining the format and the layout of the original data such as XPS and PDF; and the intermediate data is data before being converted into print data.

For example, the keyword detection unit 124 detects a predetermined keyword from the character string of the intermediate data obtained by the conversion by the intermediate data conversion request unit 123, according to a request from the output method control unit 122. Here, for example, the keyword detection unit 124 may detect predetermined information (condition) included in the intermediate data.

The data process request unit 125 makes a process request to the data processing control unit 81, to cause the data processing unit 84 to execute a predetermined data process on the intermediate data, according to a request from the output method control unit 122. For example, the data process request unit 125 requests, as a predetermined data process on the intermediate data, a combining process of overpainting an area where the predetermined keyword has been detected with a predetermined color, and a process of printing a barcode in a predetermined area when a predetermined area is detected.

The print data conversion request unit 126 converts the intermediate data on which a predetermined process has been executed by the data process request unit 125, into print data, according to a request from the output method control unit 122. The print data conversion request unit 126 makes a process request to the data processing control unit 81, to cause the data processing unit 84 to execute a process of converting the intermediate data into data that is appropriate for the image forming device 12, i.e., into printer language (Page Description Language) data.

Note that, for example, the intermediate data may be converted into output data according to the terminal device 11, the image forming device 12, and a device for displaying data such as a projector, and the print data conversion request unit 126 has a function that is an example of an output data conversion unit.

Example of Rule Information

FIG. 18 illustrates an example of rule information set in association with tenant information. As illustrated in FIG. 18, the rule information includes, for example, a tenant ID, a name, a service ID, a service type, and a rule (output method with respect to condition), as data items. Note that the rule information is managed in units of tenant IDs and service IDs; however, the rule information may be registered in units of users or in units of jobs.

In the example of FIG. 18, an output method is indicated, in which the "company A" of tenant ID "10000" performs a data process of "setting A", when "keyword A" is detected from the data of the input job in "print service" of service ID "20000".

Here, the page in which "keyword A" is detected may have a setting to stop output "do not print", and the area where "keyword A" is detected may have a setting of executing a combining process of "overpainting with predetermined color" or an editing process of "deleting keyword A". Furthermore, the data in which the "keyword A" is detected in a predetermined area, may have a setting of executing a print process such as "print a barcode" in a predetermined area.

As described above, for example, the output method control unit 122 can refer to the rule information associated with the user who input the job, determine the output method set with respect to the contents of the data of the job, and control the output of the data.

Data Output Control Process of Job

Figure 19:
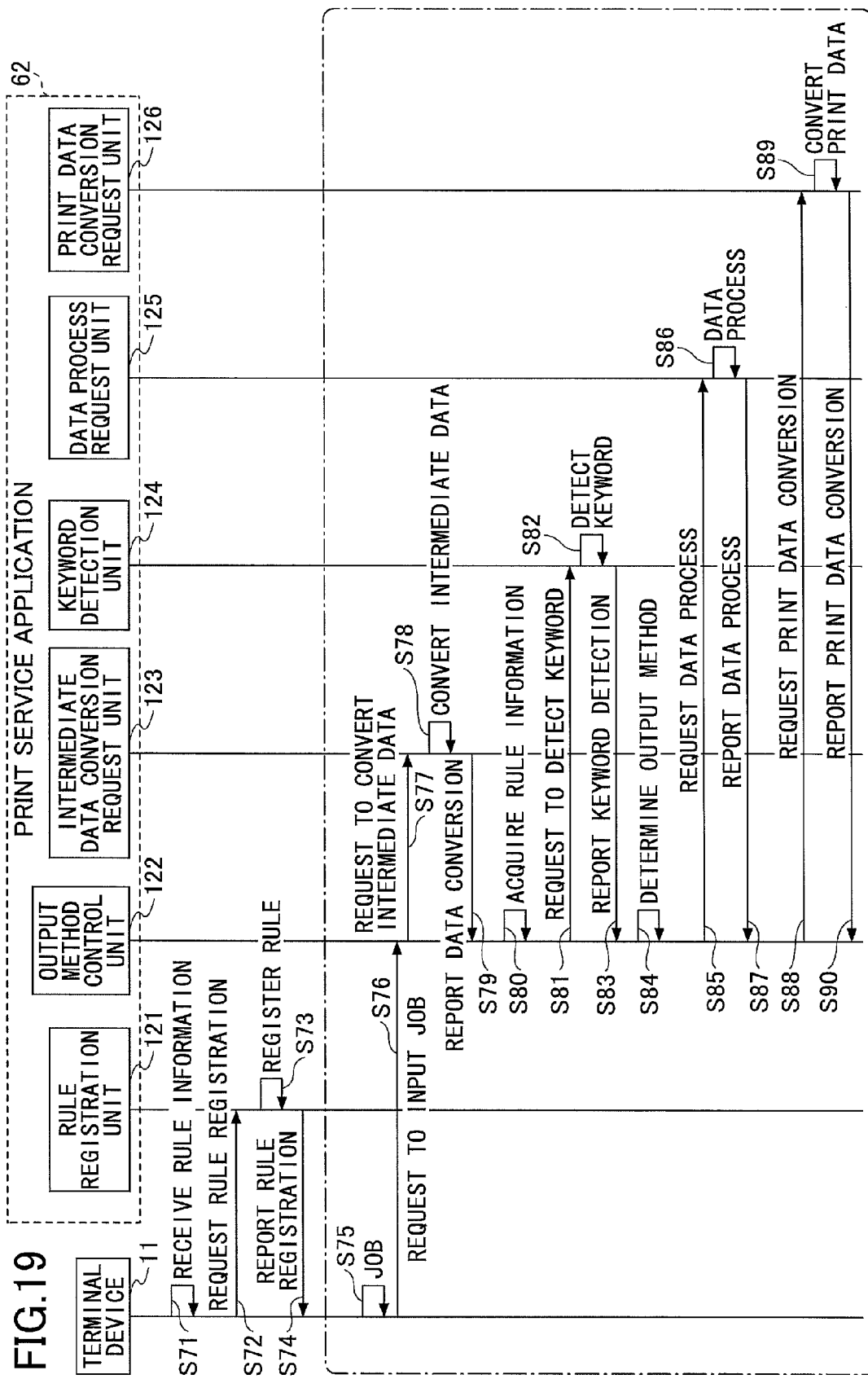
FIG. 19 is a sequence diagram of a data output control process of a job.

Next, a specific description is given of a data output control process of a job executed by the above-described process blocks, after a user, such as an administrator, registers rule information. FIG. 19 is a sequence diagram of a data output control process of a job. Note that FIG. 19 illustrates a sequence example of a data output control process performed in the terminal device 11 and the print service application 62.

In the example of FIG. 19, in order to register rule information when printing by using the print service application 62 of the service providing system 2, the terminal device 11 accesses the portal site of the service providing system 2, according to a user's operation.

Here, the access control unit 72 of the service providing system 2 causes the terminal device 11 to access the portal service application 61. The portal service application 61 displays, for example, a login screen on the operation panel of the terminal device 11.

According to an operation in the login screen by the user, the terminal device 11 logs into the portal service application 61, and accesses the print service application 62. For example, the print service application 62 displays a rule information registration screen on the operation panel of the terminal device 11. In the rule information registration screen, for example, a tenant ID, a user name, and a rule can be input.

In step S71, when the terminal device 11 receives the rule information input by the user in the rule information registration screen, in step S72, the terminal device 11 requests the rule registration unit 121 of the print service application 62 to register rule information.

In step S73, the rule registration unit 121 registers the rule information received from the terminal device 11, in association with a tenant ID, and then in step S74, the rule registration unit 121 reports to the terminal device 11 that the rule information has been registered.

Here, a description is given of a case where the terminal device 11 receives the document data to be printed at an upload screen, and the terminal device 11 uploads the document data in the print service application 62 of the service providing system 2.

In step S75, when the terminal device 11 receives document data of a job via an upload screen from the user, in step S76, the terminal device 11 requests the print service application 62 to input a job.

In step S77, when the output method control unit 122 of the print service application 62 receives a request to input a job from the terminal device 11, in order to analyze the document data of the job, the output method control unit 122 requests the intermediate data conversion request unit 123 to convert the document data into intermediate data.

In step S78, the intermediate data conversion request unit 123 converts the document data into intermediate data, and then in step S79, the intermediate data conversion request unit 123 reports to the output method control unit 122 that the document data has been converted into intermediate data.

In step S80, the output method control unit 122 acquires rule information stored in the management information storage unit 91, based on the user name that has logged in. In step S81, the output method control unit 122 requests the keyword detection unit 124 to detect a predetermined keyword from the character string of the intermediate data, based on the acquired rule information.

In step S82, when the keyword detection unit 124 detects a predetermined keyword, in step S83, the keyword detection unit 124 reports to the output method control unit 122 that a predetermined keyword has been detected.

In step S84, the output method control unit 122 determines the data output method of the job, by referring to the setting applied from the rule information illustrated in FIG. 18, based on the keyword detected by the keyword detection unit 124. In step S85, the output method control unit 122 requests the data process request unit 125 to perform a predetermined data process on the intermediate data, according to the determination result.

In step S86, the data process request unit 125 executes a predetermined data process on the intermediate data, and then in step S87, the data process request unit 125 reports to the output method control unit 122 that the predetermined data process has been executed.

In step S88, the output method control unit 122 requests the print data conversion request unit 126 to convert the intermediate data, on which the predetermined data process has been executed, into print data. In step S89, the print data conversion request unit 126 converts the intermediate data into print data, and then in step S90, the print data conversion request unit 126 reports to the output method control unit 122 that the intermediate data has been converted into print data. Accordingly, it is possible to control the output method of the data of the job input by the terminal device 11, based on rule information set in advance.

Note that in step S83, when a report is received that a predetermined keyword is not detected, the output method control unit 122 determines the method to be a normal data output method to which the rule information is not applied, and proceeds to step S88 to make a request of converting the intermediate data into print data.

Furthermore, in the above process, the predetermined process is executed by extracting a predetermined keyword from the intermediate data; however, a page index may be created based on keywords extracted in units of pages from the intermediate data, and the data process may be executed based on the page index.

Data Output Process from Image Forming Device

Figure 20:
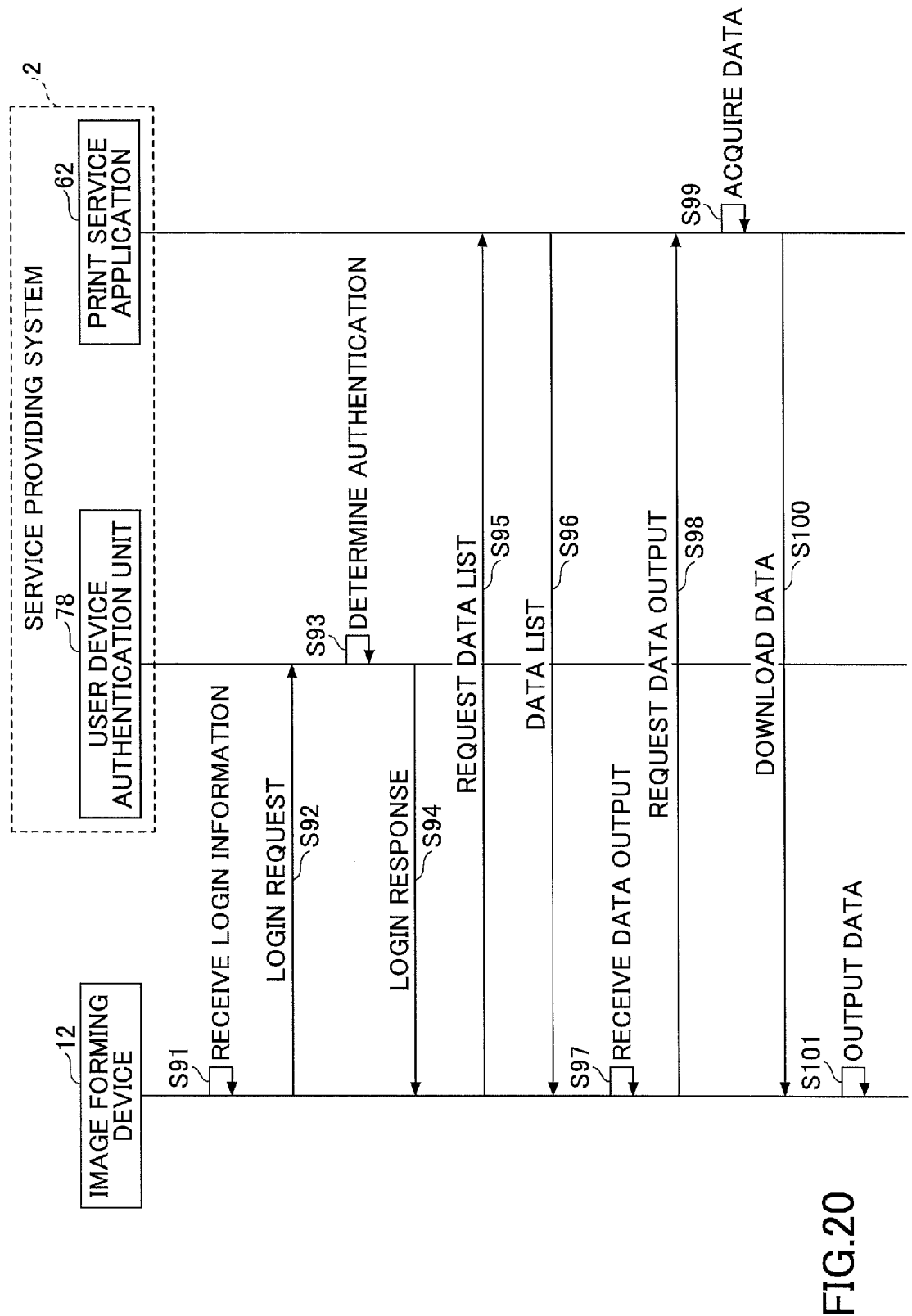
FIG. 20 illustrates a sequence of a process of outputting data from an image forming device.

Next, a description is given of an example of printing out, from the image forming device 12, the data that has been converted into print data by the data output control process illustrated in FIG. 19. FIG. 20 illustrates a sequence of a process of outputting data from the image forming device 12. Note that the process of FIG. 20 is executed by the image forming device 12, and the user device authentication unit 78 and the print service application 62 of the service providing system 2.

In the example of FIG. 20, in order to output the print data by using the print service application 62 of the service providing system 2, the image forming device 12 displays a login screen on the operation panel via an exclusive-use application installed in advance.

In step S91, the image forming device 12 receives login information according to an operation to the login screen by the user, and then in step S92, the image forming device 12 makes a login request to the user device authentication unit 78. In step S93, the user device authentication unit 78 performs user device authentication.

In step S94, the user device authentication unit 78 makes a login response based on the result of the user device authentication. For example, when the image forming device 12 receives a login response indicating login OK, in step S95, the image forming device 12 requests the print service application 62 to provide a data list indicating jobs of a particular user.

In step S96, the image forming device 12 acquires the data list from the print service application 62, and then displays the acquired data list on the screen, and prompts the user to select the data he desires to output. In step S97, the image forming device 12 receives the data that the user wants to output from the data list according to the user's operation, and then in step S98, the image forming device 12 makes a data output request to the print service application 62.

Here, in step S99, the print service application 62 acquires data corresponding to the data output request, for example, the print data whose output is controlled by the data output control process illustrated in FIG. 19, and then in step S100, the print service application 62 sends the data to the image forming device 12. In step S101, the image forming device 12 outputs the data that has been acquired from the print service application 62.

As described above, it is possible to control the data output of a job based on rule information set in advance. Note that in the above example, the data input from the terminal device 11 is subjected to output control by the print service application 62, and is output as print data from the image forming device 12; however, the present embodiment is not so limited.

For example, the embodiment may be applied to a case where the image data acquired from the image forming device 12 is subjected to output control by the distribution service application 63, and data is distributed to the online storage 32. Furthermore, the embodiment may be applied to a usage purpose where a data process such as black-painting is performed on form data acquired from the terminal device 11, and then the data is electronically saved.

According to the embodiment described above, it is possible to control the output based on contents of the data, upon managing the service and the service providing destination.

Output Control of Data: Process Block

Next, a description is given of an example of data output control of a job in the information processing system 1 according to the embodiment described above. The following describes an example of data output control in a case where overlap detection is set in the job (output request) output from the image forming device 12 in the office of the information processing system 1.

Figure 21A:
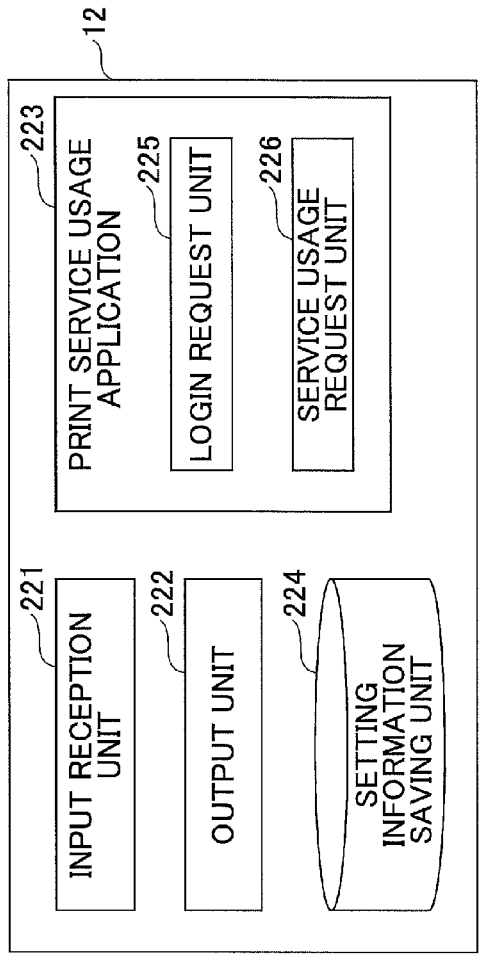
FIGS. 21A through 21C are process block diagrams of examples of the image forming device and the print service application.
Figure 21B:
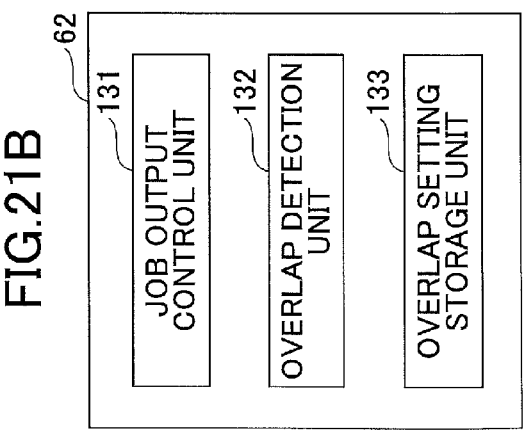
Figure 21C:
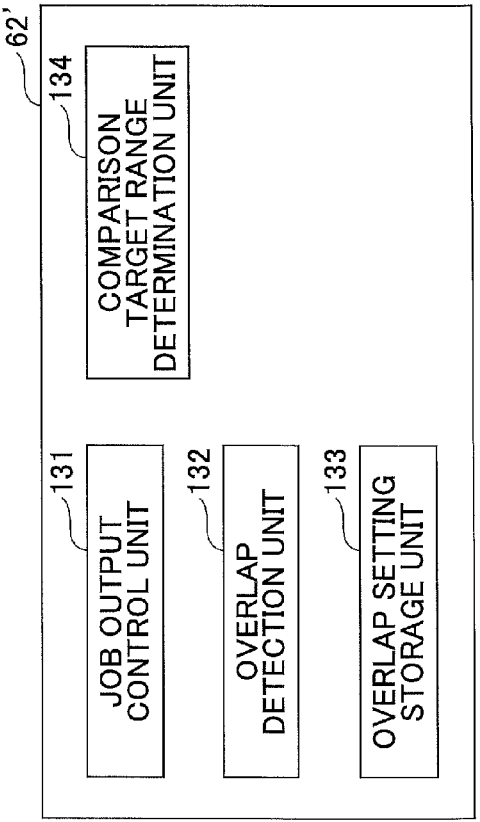

FIGS. 21A through 21C are process block diagrams of examples of the image forming device 12 and the print service application 62. FIG. 21A is a process block diagram of an example of the image forming device 12 described above. By executing a program, as illustrated in FIG. 21A, the image forming device 12 realizes an input reception unit 221, an output unit 222, a print service usage application 223, and a setting information saving unit 224.

The input reception unit 221 receives various input operations such as a login instruction, from the user. The output unit 222 outputs (for example, prints) the received data.

The print service usage application 223 includes a login request unit 225 and a service usage request unit 226, and provides a function of executing jobs. The login request unit 225 provides a function of logging into the service providing system 2 from the image forming device 12. The login request unit 225 receives a job list of the user that has logged in, from the service providing system 2.

The service usage request unit 226 receives a selection of a job for which print output is desired via the input reception unit 221, from the job list displayed on the operation panel of the image forming device 12, for example, and then requests the service providing system 2 to acquire data corresponding to the received job. The setting information saving unit 224 saves various kinds of setting information.

FIG. 21B is a process block diagram of the print service application 62 described above. As illustrated in FIG. 21B, the print service application 62 includes a job output control unit 131, an overlap detection unit 132, and an overlap setting storage unit 133.

When the job output control unit 131 receives a request to acquire data corresponding to a job, the job output control unit 131 determines whether overlap detection is set in the job. When the job output control unit 131 determines that overlap detection is set in the job, the job output control unit 131 refers to a target range of overlap detection and overlap detection conditions stored in the overlap setting storage unit 133 as conditions set in advance by the user, and requests overlap detection of a job to the overlap detection unit 132.

The job output control unit 131 controls output of the job according to the result of overlap detection of the job acquired from the overlap detection unit 132. When overlap of the job is detected, the job output control unit 131 reports to the user to stop the output of the job, or deletes the job, for example.

The overlap detection unit 132 performs an overlap detection of detecting whether a job for which overlap detection has been requested overlaps with a job that has already been received, based on a target range of overlap detection and overlap detection conditions acquired from the job output control unit 131. The overlap detection unit 132 refers to, for example, information of the process target data stored in the data processing information storage unit 92, and history information that has already been output, and performs overlap detection of the job. Note that the overlap detection unit 132 may detect the overlap of the job based on only the overlap detection condition, without setting a target range of overlap detection.

The overlap setting storage unit 133 stores a target range of overlap detection and overlap detection conditions set for each user. The target range of overlap detection is for setting the length of the past time period including jobs to be comparison targets (for example, jobs included in the time period extending from the present time point to the past hour), based on the reception time and the output time of the job. Furthermore, the target range of overlap detection may not only be for setting jobs of a particular user as comparison targets, but may also set jobs of the group to which the user belongs as comparison targets.

The overlap detection conditions are for setting information of the job such as the user name, the file name, and the file size, as information used for comparing jobs.

FIG. 21C is a process block diagram of another example of the print service application 62 described above. Note that the same elements as those of FIG. 21B are denoted by the same reference numerals and descriptions thereof are omitted.

As illustrated in FIG. 21C, the print service application 62' includes a job output control unit 131, an overlap detection unit 132, an overlap setting storage unit 133, and a comparison target range determination unit 134. That is to say, in the configuration of FIG. 21C, the comparison target range determination unit 134 is included in addition to the elements of FIG. 21B.

The comparison target range determination unit 134 receives a request from the job output control unit 131, and determines the comparison target range of the job for which overlap is to be detected by the overlap detection unit 132. The comparison target range determination unit 134 acquires, from the data processing information storage unit 92, the process target data and history information that has already been output, and determines the comparison target range of the job, based on the target range of overlap detection of the overlap setting storage unit 133 to which the job output control unit 131 has referred. The comparison target range determination unit 134 determines the comparison target range of the job, and reports the range to the job output control unit 131.

Output Control Process of Data

Figure 22:
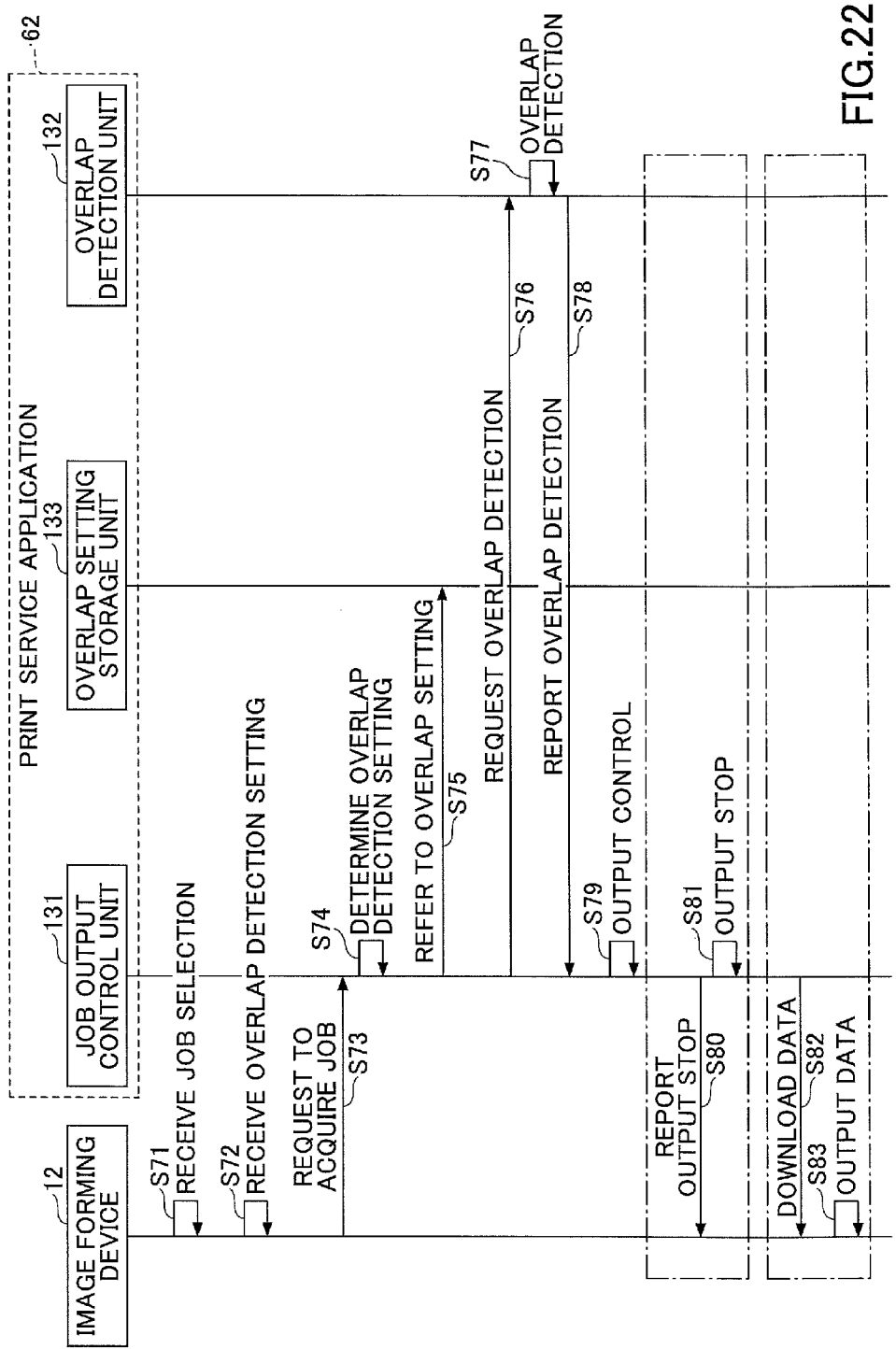
FIG. 22 is a sequence diagram of an example of an output control process of a job.

Next, a specific description is given of an output control process of data, in a case where overlap detection is set for a job, which is executed by the process blocks of the image forming device 12 illustrated in FIG. 21A and the print service application 62 illustrated in FIG. 21B. FIG. 22 is a sequence diagram of an example of an output control process of a job.

In the example of FIG. 22, first, it is assumed that a job which has been uploaded to the service providing system 2 from the terminal device 11 by the user, is spooled in the data storage unit 93 by the print service application 62.

The image forming device 12 accesses the print service application 62 according to the user's operation to the login screen displayed on the operation panel, in order to print out the data uploaded to the service providing system 2, by using the print service application 62.

The print service application 62 displays a job list screen of the user on the operation panel of the image forming device 12. When a job is selected from the job list screen, the print service application 62 displays, on the operation panel of the image forming device 12, an overlap detection setting screen, for setting overlap detection for the selected job.

Note that in the overlap detection setting screen, it is possible to set the target range of overlap detection and overlap detection conditions described above for each job, and this information may be set for each user in advance and stored in the overlap setting storage unit 133. Furthermore, in the job list screen displayed on the operation panel of the image forming device 12, it may be possible to select a job together with an overlap detection setting.

As illustrated in FIG. 22, in step S71, the service usage request unit 226 receives a selection of a job made by the user in the job list screen. In step S72, the service usage request unit 226 receives a report that overlap detection has been set for the selected job in the overlap detection setting screen, and then in step S73, the service usage request unit 226 requests the print service application 62 to acquire the data of the job.

In step S74, the job output control unit 131 of the print service application 62 determines whether the job received from the image forming device 12 has a setting of overlap detection. When the job output control unit 131 determines that the job has a setting of overlap detection, in step S75, the job output control unit 131 refers to the target range of overlap detection and overlap detection conditions stored in the overlap setting storage unit 133.

In step S76, the job output control unit 131 requests the overlap detection unit 132 to perform overlap detection of the job. In step S77, the overlap detection unit 132 performs overlap detection by referring to information of process target data in the data processing information storage unit 92 and history information that has been already output, based on the target range of overlap detection and overlap detection conditions acquired from the job output control unit 131.

Note that in step S75, the job output control unit 131 may refer to the target range of overlap detection in the overlap setting storage unit 133, and then acquire the process target data and history information that has been already output from the data processing information storage unit 92, and determine the comparison target range of the job. Here, the job output control unit 131 excludes, from the comparison targets, jobs other than those determined as the comparison target range, among the jobs in the process target data and the history information already output.

Accordingly, in step S76, the overlap detection unit 132 acquires the jobs determined as the comparison target range from the job output control unit 131, and in step S77, it is possible to execute the overlap detection with respect to jobs determined as the comparison target range.

In step S78, the job output control unit 131 receives an overlap detection report from the overlap detection unit 132, and then in step S79, the job output control unit 131 controls the output of the job based on the result of the overlap detection report.

Here, descriptions are divided into a case where overlap is detected as a result of the overlap detection report, and a case where overlap is not detected. When overlap is detected, in step S80, the job output control unit 131 executes a process of reporting to stop the output of the job (output stop of job) to the user operating the image forming device 12, and in step S81, the job output control unit 131 deletes the job for which output has been stopped.

Conversely, when overlap is not detected, in step S82, the job output control unit 131 outputs the print data of the job to the image forming device 12. In step S83, the image forming device 12 prints out the print data.

By the output control process of data described above, even when acquisition requests are executed for the same job, by detecting an overlap of jobs, it is possible to prevent a job from being needlessly output.

Another Example of Output Control Process of Data

Next, a specific description is given of an output control process of data, in a case where overlap detection is set for a job, which is executed by the terminal device 11 and the process blocks of the print service application 62' illustrated in FIG. 21C. FIG. 23 is a sequence diagram of another example of an output control process of a job.

In the example of FIG. 23, the terminal device 11 accesses the portal site of the service providing system 2 according to the user's operation, in order to upload the data of the job to be printed by using the print service application 62' of the service providing system 2.

Here, the access control unit 72 of the service providing system 2 causes the terminal device 11 to access the portal service application 61. The portal service application 61 displays a login screen on the operation panel of the terminal device 11.

The terminal device 11 logs into the portal service application 61 according to a user's operation in the login screen, and then accesses the print service application 62' via the intermediate data conversion request unit 123. The print service application 62' displays an upload screen on the operation panel of the terminal device 11.

In step S91, the terminal device 11 receives data of the job from the upload screen, and in step S92, the terminal device 11 receives a report that the user has set overlap detection in the job to be uploaded, in the upload screen.

In step S93, the terminal device 11 requests the job output control unit 131 of the print service application 62' to input a job, and then the job output control unit 131 determines whether the job input from the terminal device 11 has a setting of overlap detection.

When the job output control unit 131 determines that the job has a setting of overlap detection, in step S95, the job output control unit 131 refers to the target range of overlap detection and overlap detection conditions stored in the overlap setting storage unit 133.

In step S96, the job output control unit 131 requests the comparison target range determination unit 134 to determine the comparison target range of the job, based on the target range of overlap detection referred to in step S95.

In step S97, the comparison target range determination unit 134 acquires, from the data processing information storage unit 92, the process target data and history information that has already been output, and determines the comparison target range of the job. Here, the comparison target range determination unit 134 excludes, from the comparison targets, jobs other than those determined as the comparison target range, among the jobs in the process target data and the history information already output.

In step S98, the comparison target range determination unit 134 reports the comparison target range (for example, from ID001 to ID200) of the job, to the job output control unit 131.

In step S99, the job output control unit 131 requests the overlap detection unit 132 to perform overlap detection of the job. In step S100, the overlap detection unit 132 performs overlap detection, based on the comparison target range of the job and overlap detection conditions acquired from the job output control unit 131.

In step S100, the job output control unit 131 receives an overlap detection report from the overlap detection unit 132, and then in step S102, the job output control unit 131 controls the output of the job based on the result of the overlap detection report. For example, when overlap is detected, the job output control unit 131 implements control so that the job is not spooled in the data storage unit 93, and when overlap is not detected, the job output control unit 131 implements control to spool the job in the data storage unit 93.

By the output control process of data described above, even when the same job is input, by detecting an overlap of jobs, it is possible to prevent spooling caused by a needlessly input job. Note that even when overlap is detected, the job may be spooled, and the job may be deleted in the output control process of FIG. 22.

As described above, overlap of jobs is detected, at a timing when a request to acquire a job is received at the service providing system 2 from the image forming device 12, or at a timing when a job is input to the service providing system 2 from the terminal device 11. Accordingly, it is possible to detect an overlapping, needless job.

According to the embodiment described above, it is possible to detect an overlap of output requests, upon managing the service and the service providing destination.

The service providing system and the service providing method are not limited to the specific embodiments described herein, and variations and modifications may be made without departing from the spirit and scope of the present invention. Note that the terminal device 11 and the image forming device 12 correspond to a service usage device. The user authentication unit 77 and the user device authentication unit 78 correspond to an authentication unit. The portal service application 61 corresponds to a service specification unit. The print service application 62, the data processing control unit 81, the processing queue 82, the data process request unit 83, and the data processing unit 84 correspond to an execution unit.

According to one embodiment of the present invention, a service providing system and a service providing method are provided, which are capable of controlling output based on contents of the data.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2013-157795, filed on Jul. 30, 2013, Japanese Priority Patent Application No. 2013-158465, filed on Jul. 31, 2013, the entire contents of which are hereby incorporated herein by reference.

What is claimed is:

1. A service providing system for providing a service to a service usage device connected via a network, the service providing system being constituted by at least one information processing device, the service providing system comprising:

a management information storage unit configured to store management information, in which service identification information of the service, user identification information of a user using the service, and device identification information of the service usage device are associated with each other;

an authentication unit configured to execute an authentication process, by using, as authentication information, user authentication information used for user authentication, or device authentication information used for device authentication, acquired from the service usage device;

a service specification unit configured to specify the service associated with the authentication information, based on the authentication information authenticated by the authentication unit and the management information; and an execution unit configured to execute a process according to a usage request to use the service, when the usage request to use the service specified by the service specification unit is acquired from the service usage device, wherein the execution unit executes control of output, based on contents of an output request from the service usage device instructed by the user, wherein the execution unit detects a predetermined keyword from data of the output request acquired from the service usage device, and controls the output of the data based on an output method set in advance in accordance with the detected keyword, and wherein the execution unit includes:
- an intermediate data conversion request unit configured to request to convert the data of the output request into intermediate data,
- an output method control unit configured to determine the output method, based on the predetermined keyword detected from the intermediate data obtained by the converting by the intermediate data conversion request unit,
- a data process request unit configured to request to execute a data process on the intermediate data, according to a determination result of the output method obtained by the output method control unit, and
- an output data conversion unit configured to convert the intermediate data, on which the data process has been executed by the data process request unit, into output data corresponding to the service usage device.

2. The service providing system according to claim 1, wherein
the execution unit controls the output of the data, based on the predetermined keyword and the output method, which are stored in association with the user identification information.

3. The service providing system according to claim 1, wherein
the control of the output of the data includes at least one of stopping the output of the data including the predetermined keyword, and performing combining, editing, and printing with respect to the predetermined keyword.

4. The service providing system according to claim 1, wherein
the execution unit detects an overlap of the output request from the service usage device instructed by the user, with an output request that has already been received.

5. The service providing system according to claim 4, wherein
the execution unit detects the overlap with the output request that has already been received, at a timing when an acquisition request to acquire data corresponding to the output request is received from the service usage device, or at a timing when data of the output request is received from the service usage device.

6. The service providing system according to claim 4, wherein
the execution unit detects the overlap with the output request that has already been received, based on a target range of overlap detection or an overlap detection condition which is set in advance.

7. The service providing system according to claim 4, wherein when the overlap with the output request that has already been received is detected, the execution unit either sends a report to the user to stop the output, or deletes the output request from the service usage device.

8. The service providing system according to claim 1, wherein
the management information storage unit stores first user identification information and second user identification information as the user identification information of the user to log into the service providing system,
the authentication unit executes a user authentication process based on first user authentication information and the first user identification information, when the first user authentication information is acquired as user authentication information used for performing user authentication from the service usage device, and
the authentication unit executes a user authentication process based on second user authentication information and the second user identification information, when the second user authentication information is acquired as user authentication information used for performing user authentication from the service usage device.

9. The service providing system according to claim 1, wherein
the management information storage unit stores third user authentication information, as user authentication information of the user to log into an external service connected to the service providing system via a network, and
the execution unit executes a login process to the external service based on the third user authentication information of the user authenticated by the authentication unit, when the process according to the usage request to use the service includes a process of cooperating with the external service.

10. A service providing system for providing a service to a service usage device connected via a network, the service providing system being constituted by at least one information processing device, the service providing system comprising:
a management information storage unit configured to store management information, in which service identification information of the service, user identification information of a user using the service, and device identification information of the service usage device are associated with each other;
an authentication unit configured to execute an authentication process, by using, as authentication information, user authentication information used for user authentication, or device authentication information used for device authentication, acquired from the service usage device;
a service specification unit configured to specify the service associated with the authentication information, based on the authentication information authenticated by the authentication unit and the management information;
an execution unit configured to execute a process according to a usage request to use the service, when the usage request to use the service specified by the service specification unit is acquired from the service usage device,
a license information storage unit configured to store license information, in which first service identification information included in the service identification information that identifies a first service and that is a license of the first service, and registration information for registering the first service identification information as the service to be provided, are associated with each other;

a license authentication unit configured to receive a registration request including the first service identification information and the registration information, and execute a license authentication process based on the first service identification information and the registration information that have been received and the license information; and a setting registration unit configured to register, in the management information, the received first service identification information as the service to be provided, when validity is confirmed by the license authentication unit, wherein the execution unit executes control of output, based on contents of an output request from the service usage device instructed by the user.

11. A service providing system for providing a service to a service usage device connected via a network, the service providing system being constituted by at least one information processing device, the service providing system comprising:

a management information storage unit configured to store management information, in which service identification information of the service, user identification information of a user using the service, and device identification information of the service usage device are associated with each other;

an authentication unit configured to execute an authentication process, by using, as authentication information, user authentication information used for user authentication, or device authentication information used for device authentication, acquired from the service usage device;

a service specification unit configured to specify the service associated with the authentication information, based on the authentication information authenticated by the authentication unit and the management information;

an execution unit configured to execute a process according to a usage request to use the service, when the usage request to use the service specified by the service specification unit is acquired from the service usage device, an execution request information storage unit configured to store, for each process content, execution request information of the process according to the usage request to use the service;

a data process control unit configured to register, in the execution request information storage unit for each process content, execution request information for executing a particular data process, according to the usage request to use the service; and a plurality of data processing units configured to execute a data process corresponding to the process content, according to the execution request information stored in the execution request information storage unit, wherein the execution unit executes control of output, based on contents of an output request from the service usage device instructed by the user, and wherein each of the plurality of data processing units register, in the execution request information storage unit, the execution request information of a next data process for each process content, when there is a next data process after executing the data process.

12. The service providing system according to claim 11, wherein the plurality of data processing units include at least a data processing unit configured to execute a data process of generating a plurality of items of the execution request information according to the execution request information, and subsequently register, in the execution request information storage unit, the generated execution request information as the execution request information of the next data process.

13. A service providing method performed in a service providing system for providing a service to a service usage device connected via a network, the service providing system being constituted by at least one information processing device, the service providing method comprising:

storing management information, in which service identification information of the service, user identification information of a user using the service, and device identification information of the service usage device are associated with each other;

executing an authentication process, by using, as authentication information, user authentication information used for user authentication, or device authentication information used for device authentication, acquired from the service usage device;

specifying the service associated with the authentication information, based on the authenticated authentication information and the management information; and executing a process according to a usage request to use the service, when the usage request to use the specified service is acquired from the service usage device, wherein the executing of the authentication process includes executing control of output, based on contents of an output request from the service usage device instructed by the user, wherein the executing of the authentication process includes detecting a predetermined keyword from data of the output request acquired from the service usage device, and controlling the output of the data based on an output method set in advance in accordance with the detected keyword, and wherein the executing of the process includes:

requesting to convert the data of the output request into intermediate data, determining the output method, based on the predetermined keyword detected from the intermediate data obtained by the requesting to convert the data of the output request into intermediate data, requesting to execute a data process on the intermediate data, according to a determination result of the output method obtained by the step of determining the output method, and converting the intermediate data, on which the data process has been executed in the step of requesting to execute the data process, into output data corresponding to the service usage device.

14. The service providing method according to claim 13, wherein the executing of the authentication process includes detecting an overlap of the output request from the service usage device instructed by the user, with an output request that has already been received.

15. A non-transitory computer-readable recording medium storing a program that causes a computer to execute a process performed in a service providing system for providing a service to a service usage device connected via a network, the service providing system being constituted by at least one information processing device, the process comprising:

storing management information, in which service identification information of the service, user identification information of a user using the service, and device identification information of the service usage device are associated with each other;

executing an authentication process, by using, as authentication information, user authentication information used for user authentication, or device authentication information used for device authentication, acquired from the service usage device;

specifying the service associated with the authentication information, based on the authenticated authentication information and the management information; and executing a process according to a usage request to use the service, when the usage request to use the specified service is acquired from the service usage device, wherein the executing of the authentication process includes executing control of output, based on contents of an output request from the service usage device instructed by the user, wherein the executing of the authentication process includes detecting a predetermined keyword from data of the output request acquired from the service usage device, and controlling the output of the data based on an output method set in advance in accordance with the detected keyword, and wherein the executing of the process includes:
  requesting to convert the data of the output request into intermediate data,
  determining the output method, based on the predetermined keyword detected from the intermediate data obtained by the requesting to convert the data of the output request into intermediate data,
  requesting to execute a data process on the intermediate data, according to a determination result of the output method obtained by the step of determining the output method, and
  converting the intermediate data, on which the data process has been executed in the step of requesting to execute the data process, into output data corresponding to the service usage device.

16. The non-transitory computer-readable recording medium according to claim 15, wherein
the executing of the authentication process includes detecting an overlap of the output request from the service usage device instructed by the user, with an output request that has already been received.

* * * * *